United States Patent
Goto et al.

(10) Patent No.: US 8,188,154 B2
(45) Date of Patent: May 29, 2012

(54) DECOMPOSITION REACTION APPARATUS, SYSTEM FOR PRODUCING RAW MATERIAL FOR RECYCLED RESIN COMPOSITION, METHOD FOR PRODUCING RAW MATERIAL FOR RECYCLED RESIN COMPOSITION, RAW MATERIAL FOR RECYCLED RESIN COMPOSITION, AND FORMED ARTICLE

(75) Inventors: Junya Goto, Tokyo (JP); Sumiya Miyake, Tokyo (JP); Masaki Ishikawa, Tokyo (JP); Kazunori Shimoyachi, Tokyo (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 636 days.

(21) Appl. No.: 11/667,107

(22) PCT Filed: Oct. 7, 2005
(Under 37 CFR 1.47)

(86) PCT No.: PCT/JP2005/018643
§ 371 (c)(1),
(2), (4) Date: Jul. 14, 2008

(87) PCT Pub. No.: WO2006/051663
PCT Pub. Date: May 18, 2006

(65) Prior Publication Data
US 2009/0215912 A1    Aug. 27, 2009

(30) Foreign Application Priority Data

Nov. 9, 2004   (JP) ................................. 2004-325606
Mar. 29, 2005  (JP) ................................. 2005-096501

(51) Int. Cl.
*C08J 11/04* (2006.01)
*B01J 8/00* (2006.01)

(52) U.S. Cl. .......... 521/40; 521/40.5; 521/48; 521/48.5; 521/49; 422/600; 422/606; 422/608; 422/292; 422/305

(58) Field of Classification Search ............... 422/189, 422/193, 194, 197, 292, 305, 600, 606, 608; 521/40, 40.5, 48, 48.5, 49
See application file for complete search history.

(56) References Cited

U.S. PATENT DOCUMENTS 3,884,992 A * 5/1975 Shimizu et al. ............... 525/119
(Continued)

FOREIGN PATENT DOCUMENTS

CN    1233624    11/1999
(Continued)

OTHER PUBLICATIONS

Chinese Office Action issued on Nov. 6, 2009 for Chinese Application No. 200580038321.
(Continued)

*Primary Examiner* — Walter D Griffin
*Assistant Examiner* — Huy-Tram Nguyen
(74) *Attorney, Agent, or Firm* — Smith, Gambrell & Russell, LLP

(57) ABSTRACT

A decomposition reaction apparatus for the decomposition treatment of a thermosetting resin, which comprises a reaction apparatus comprising an introduction section for introducing a resin composition containing the thermosetting resin and a solvent containing a monomer component of the thermosetting resin or a component similar to the monomer component, a decomposition reaction section for heating and pressuring the resin composition and the above solvent so as for the solvent to have a supercritical state or a subcritical state, to thereby prepare a treated and recovered product containing a recycled resin formed by the reduction of the molecular weight of the above thermosetting resin, and a discharge section for discharging the treated and recovered product. In the above reaction apparatus, the introduction of the resin composition and the solvent, the decomposition treatment of the thermosetting resin in the decomposition reaction section and the discharge of the treated and recovered product from the discharge section are all carried out continuously, and therefore, a raw material for a recycled resin composition using an industrial or general waste containing a thermosetting resin as the above resin composition can be produced continuously.

13 Claims, 5 Drawing Sheets

U.S. PATENT DOCUMENTS

| | | | |
|---|---|---|---|
| 4,517,354 A * | 5/1985 | D'Alelio | 528/172 |
| 4,721,761 A * | 1/1988 | Omae et al. | 526/64 |
| 5,059,662 A * | 10/1991 | Wikelski et al. | 526/208 |
| 5,068,383 A * | 11/1991 | Bourgoin et al. | 556/452 |
| 5,194,518 A * | 3/1993 | Shirai et al. | 525/426 |
| 5,385,778 A * | 1/1995 | Deviney et al. | 428/319.7 |
| 5,508,312 A * | 4/1996 | Munzmay et al. | 521/49.5 |
| 5,977,251 A * | 11/1999 | Kao et al. | 525/53 |
| 6,245,822 B1 * | 6/2001 | Terada et al. | 521/49 |
| 6,660,236 B1 * | 12/2003 | Kodama et al. | 422/616 |
| 6,774,271 B2 * | 8/2004 | Jiang | 585/241 |
| 7,045,060 B1 * | 5/2006 | Liles et al. | 210/199 |
| 2003/0114608 A1 * | 6/2003 | Tharappel et al. | 526/64 |
| 2005/0165181 A1 * | 7/2005 | Tharappel et al. | 526/113 |

FOREIGN PATENT DOCUMENTS

| | | |
|---|---|---|
| CN | 1397627 | 2/2003 |
| JP | 10-147786 | 6/1998 |
| JP | 11-140224 | 5/1999 |
| JP | 11-286572 | 10/1999 |
| JP | 2000-297053 | 10/2000 |
| JP | 2001-98107 | 4/2001 |
| JP | 2001-151933 | 6/2001 |
| JP | 2003-253041 | 9/2003 |
| JP | 2004-161983 | 6/2004 |
| WO | WO 2004041917 A1 * | 5/2004 |

OTHER PUBLICATIONS

Keywords: modeling; synthesis process; particle size distribution; temperature distribution; chemical vapor deposition; aluminum nitride; ultrafine particles, Journal of East China Institute of Chemical Technology, vol. 18, No. 5, Oct. 1992, pp. 543-548.

* cited by examiner

DECOMPOSITION REACTION APPARATUS, SYSTEM FOR PRODUCING RAW MATERIAL FOR RECYCLED RESIN COMPOSITION, METHOD FOR PRODUCING RAW MATERIAL FOR RECYCLED RESIN COMPOSITION, RAW MATERIAL FOR RECYCLED RESIN COMPOSITION, AND FORMED ARTICLE

FIELD OF THE INVENTION

The present invention relates to a decomposition reaction apparatus, a system for producing a raw material for a recycled resin composition, a method for producing a raw material for a recycled resin composition, a raw material for a recycled resin composition, and a formed article.

BACKGROUND ART

Use of fossil resources is inevitable in recent years. The fossil resources cannot be reproduced and may probably be exhausted in the near future. In an effort to solve the problem of fossil resource exhaustion, there have been developed techniques for controlling consumption of the fossil resources as chemical raw materials (resource saving techniques) and techniques for controlling consumption of the fossil resources as energy (energy saving techniques). Among the techniques for controlling consumption of the fossil resources as chemical raw materials, attention is paid to a technique of recycling plastics whose raw material is the fossil resources. However, plastics are more difficult to recycle than other materials such as metal and glass and it is the current situation that the plastics recycling technique has not yet been put into practical use. In particular, a thermosetting resin is neither softened or melted by heat nor dissolved in a solvent once it is cured. For this reason, it is technically difficult to regenerate, i.e., recycle, a cured article of a thermosetting resin into a raw material for plastics.

In order to overcome such a problem encountered in treating or recycling plastics, studies have been made for methods of solubilizing plastics by use of supercritical fluid or subcritical fluid. For instance, a method for solubilizing a thermosetting resin in a supercritical or subcritical solution of phenol compound or water/phenol compound has been investigated to solubilize and recycle a thermosetting resin which is difficult to solubilize with supercritical water (see, e.g., patent document 1: JP2001-151933A). With this method, it is possible to recover oligomer components by solubilizing a cured article of a thermosetting resin such as a phenol resin or the like. The oligomer components can be reused as a raw material for a thermosetting resin.

However, the technique set forth in the patent document 1 is directed to a production method that makes use of a batch type reactor. The batch type reactor suffers from problems of delay in heat transfer to the interior thereof and unevenness in reaction, especially in high-temperature and high-pressure reaction conditions. Thus, the batch type reactor is an arrangement ill-suited for a mass production. With regard to a recycling method, the patent document 1 refers to the reuse of the afore-mentioned oligomer components and mononuclear phenol but remains silent on a reuse method of a solid residue and the like contained in the reactants. In this viewpoint, it is hard to say that the patent document 1 discloses an arrangement suitable for mass production and commercialization.

As an improvement of the method for solubilizing a thermosetting resin in a supercritical or subcritical solution of phenol compound or water/phenol compound, there has been proposed a method of increasing a molecular weight of recoverable oligomer components by adding a formaldehyde compound and causing a polymerization reaction in the process of decomposing and solubilizing a thermosetting resin (see, e.g., patent document 2: JP2004-161983A). This method provides an advantage that it is possible to recover oligomer components of higher molecular weight merely by performing a solubilization treatment and further that the oligomer components can be reused in a broader range of applications.

However, the method specifically disclosed in the patent document 2 is also performed by a batch type reactor and therefore is not completely suitable for use in the mass production installation.

On the other hand, there has been disclosed a technique of continuously liquefying a cellulose-containing material at an elevated temperature (see, e.g., patent document 3: JP10-147786). This technique is directed to liquefaction of a naturally occurring material which can be relatively easily decomposed. Although the technique suggests a general methodology of the mass production, it fails to propose a concrete and practicable arrangement to an ordinary skilled person who intends to use the technique in decomposing and/or solubilizing plastics including a thermosetting resin.

SUMMARY OF THE INVENTION

It is an object of the present invention to provide a decomposition reaction apparatus capable of continuously producing a raw material for a recycled resin composition using an industrial waste or a general waste containing a thermosetting resin as a resin composition, a system for producing a raw material for a recycled resin composition provided with the decomposition reaction apparatus, a method for producing a raw material for a recycled resin composition by use of the system for producing a raw material for a recycled resin, a raw material for a recycled resin composition produced by the method for producing a raw material for a recycled resin, and a formed article formed by using the recycled resin composition raw material as a resin composition.

An object is achieved by the present invention which is specified in following (1) to (27).

(1) A decomposition reaction apparatus for decomposing a thermosetting resin, comprising:
 an introduction section for introducing a resin composition containing the thermosetting resin and a solvent containing a monomer component of the thermosetting resin or a derivative of the monomer component;
 a decomposition reaction section for obtaining a first treated recovery product containing a recycled resin formed of the thermosetting resin with a reduced molecular weight, by heating and pressurizing the resin composition and the solvent and bringing the solvent into a supercritical state or a subcritical state; and
 a discharge section for discharging the first treated recovery product,
 wherein introduction of the resin composition and the solvent into the introduction section, decomposition treatment of the thermosetting resin in the decomposition reaction section and discharge of the first treated recovery product from the discharge section are all performed continuously.

(2) The decomposition reaction apparatus described above (1), wherein the decomposition reaction section is comprised of a tube-type reactor and is adapted to perform the decomposition treatment with the resin composition and the solvent through the tube-type reactor.

(3) The decomposition reaction apparatus described above (2), wherein, assuming that the tube-type reactor has a length of L(m) and a diameter of D(m), L/D is in a range of 10 to 5000.

(4) The decomposition reaction apparatus described above (2) or (3), wherein a stationary mixer is provided within the tube-type reactor.

(5) The decomposition reaction apparatus described in any one of above (1) to (4), wherein a treatment temperature in the decomposition reaction section is in a range of 200 to 500° C.

(6) The decomposition reaction apparatus described in any one of above (1) to (5), wherein a pressure in the decomposition reaction section is in a range of 1 to 60 MPa.

(7) The decomposition reaction apparatus described in any one of above (1) to (6), wherein a space time in the decomposition reaction section is in a range of 1 to 60 minutes.

(8) The decomposition reaction apparatus described in any one of above (1) to (7), wherein a mixture of the resin composition and the solvent is introduced into the introduction section and wherein the mixture has a viscosity of 0.001 to 1000 Pa·s.

(9) The decomposition reaction apparatus described in any one of above (1) to (8), further comprising a supply unit for continuously supplying the resin composition and the solvent to the introduction section.

(10) The decomposition reaction apparatus described above (9), wherein the supply unit comprises a mixing device for mixing the resin composition and the solvent to obtain a mixture.

(11) The decomposition reaction apparatus described above (9) or (10), wherein the supply unit comprises a pressurizing device for pressurizing and supplying the resin composition and the solvent to the introduction section.

(12) The decomposition reaction apparatus described in any one of above (9) to (11), wherein the supply unit is adapted to supply a base catalyst to the introduction section together with the resin composition and the solvent.

(13) A system for producing a raw material for a recycled resin composition, comprising:
  the decomposition reaction apparatus described in any one of above (1) to (12),
  wherein at least a part of the first treated recovery product discharged from the discharge section of the decomposition reaction apparatus and/or a second treated recovery product obtained by treating the first treated recovery product is used as the raw material for the recycled resin composition.

(14) The system described above (13), further comprising a polymerization reaction apparatus for obtaining the second treated recovery product containing a recycled resin with an increased molecular weight by introducing and polymerizing the first treated recovery product and a multifunctional compound.

(15) The system described above (14), further comprising a first separating unit for separating and removing a solid residue from the first treated recovery product and a second separating unit for separating and extracting the recycled resin with an increased molecular weight and a low-boiling-point component containing the solvent from the second treated recovery product, the polymerization reaction apparatus being provided between the first separating unit and the second separating unit.

(16) The system described above (14) or (15), wherein the polymerization reaction apparatus comprises a polymerization reaction section for obtaining the second treated recovery product by polymerizing the recycled resin and the multifunctional compound and wherein introduction of the recycled resin and the multifunctional compound into the polymerization reaction section, polymerization reaction in the polymerization reaction section and discharge of the second treated recovery product from the polymerization reaction section are all performed continuously.

(17) The system described above (16), wherein the polymerization reaction section is comprised of a tube-type reactor and wherein a stationary mixer is provided within the tube-type reactor.

(18) The system described above (16) or (17), wherein a treatment temperature in the polymerization reaction section is in a range of 100 to 400° C.

(19) The system described in any one of above (16) to (18), wherein a pressure in the polymerization reaction section is equal to or smaller than 60 MPa.

(20) The system described in any one of above (16) to (19), wherein a space time in the polymerization reaction section is in a range of 1 to 60 minutes.

(21) The system described in any one of above (13) to (20), further comprising a first separating unit for separating and removing a solid residue from the first treated recovery product and/or the second treated recovery product.

(22) The system described above (21), further comprising a second separating unit for separating and extracting the recycled resin and/or the recycled resin with an increased molecular weight as well as the a low-boiling-point component containing the solvent from the first treated recovery product and/or the second treated recovery product from which the solid residue has been removed.

(23) The system described above (22), wherein a return line for returning the low-boiling-point component extracted in the second separating unit to the introduction section of the decomposition reaction apparatus is connected to the second separating unit.

(24) The system described in any one of above (21) to (23), wherein the decomposition reaction apparatus and the first separating unit are interconnected through a cooling device for cooling the first treated recovery product discharged from the decomposition reaction apparatus.

(25) A method for producing a raw material for a recycled resin composition by use of the system for producing a raw material for a recycled resin composition described in any one of above (13) to (24), comprising:
  continuously introducing the resin composition and the solvent into the introduction section of the decomposition reaction apparatus;
  obtaining a first treated recovery product containing a recycled resin formed of the thermosetting resin with a reduced molecular weight, by heating and pressurizing the resin composition and the solvent in the decomposition reaction section of the decomposition reaction apparatus and bringing the solvent into a supercritical state or a subcritical state; and
  continuously discharging the first treated recovery product from the discharge section of the decomposition reaction apparatus,
  wherein at least a part of the first treated recovery product and/or a second treated recovery product obtained by treating the first treated recovery product is used as the raw material for a recycled resin composition.

(26) A raw material for a recycled resin composition obtained by the method for producing a raw material for a recycled resin composition described above (25).

(27) A formed article formed by using the raw material for a recycled resin composition described above (26).

BEST MODE FOR CARRYING OUT THE INVENTION

Hereinafter, a decomposition reaction apparatus, a system for producing a raw material for a recycled resin composition, a method for producing a raw material for a recycled resin composition, a raw material for a recycled resin composition, and a formed article in accordance with the present invention will be described in detail.

First Embodiment

At the outset, a first embodiment of the present invention will be described with reference to FIGS. 1 and 2.

Figure 1:
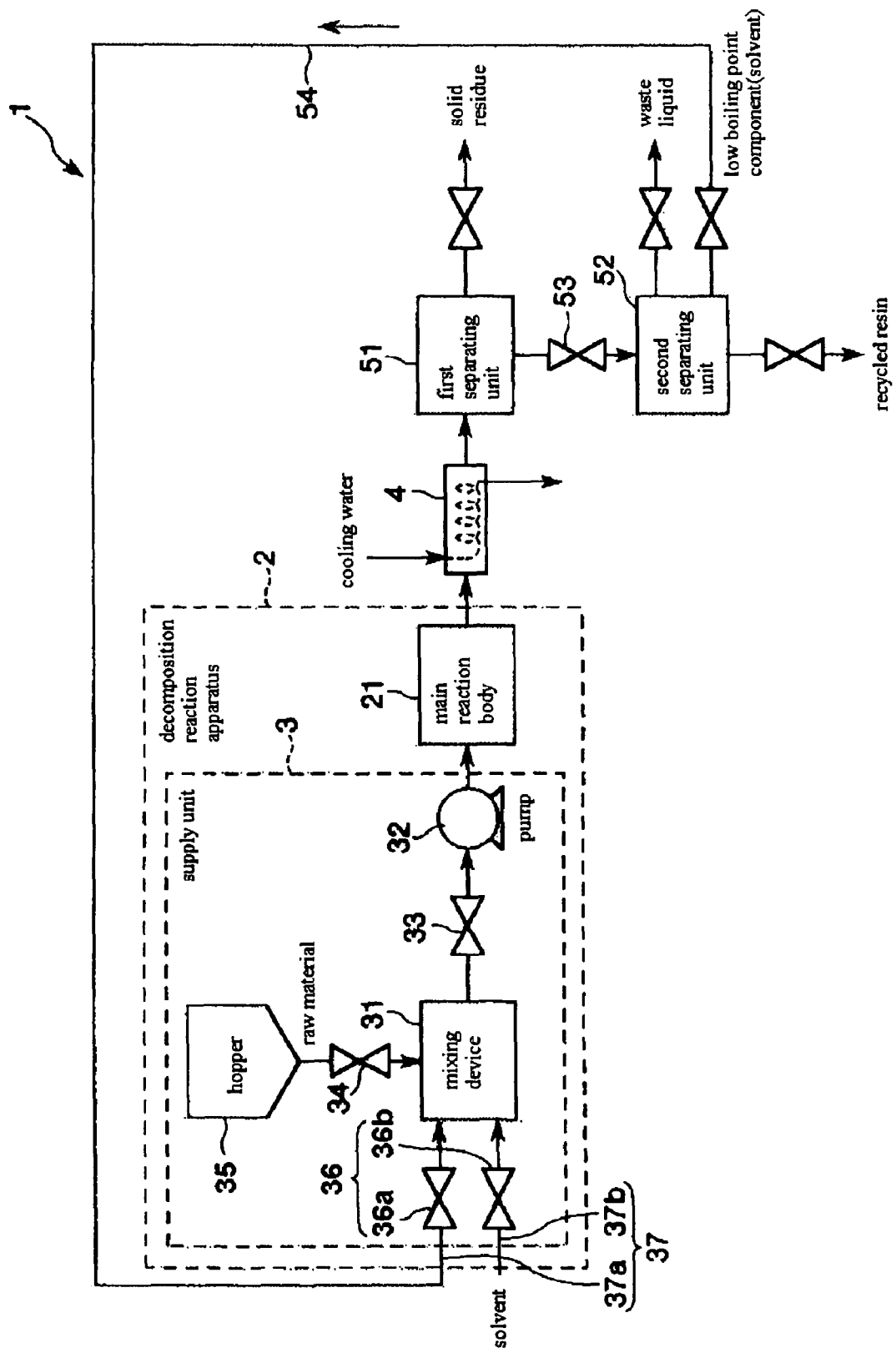
FIG. 1 is a schematic configuration diagram of a system for producing a raw material for a recycled resin composition in accordance with a first embodiment of the present invention.
Figure 2:
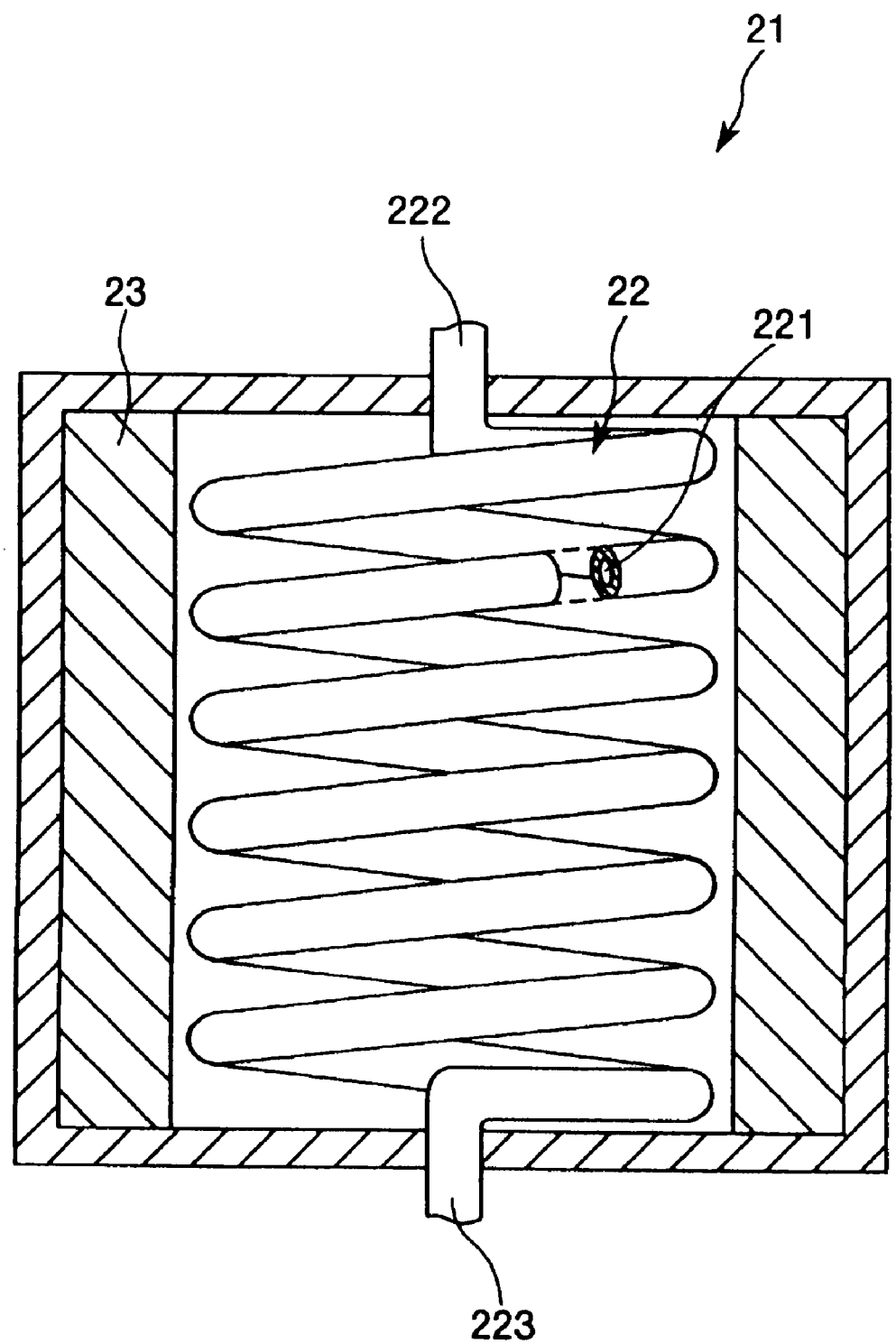
FIG. 2 is a section view showing a main reaction body of a decomposition reaction apparatus provided in the system for producing a raw material for a recycled resin composition shown in FIG. 1.

FIG. 1 is a schematic configuration diagram showing a system for producing a raw material for a recycled resin composition in accordance with a first embodiment of the present invention and FIG. 2 is a section view showing a main reaction body of a decomposition reaction apparatus provided in the system for producing a raw material for a recycled resin composition shown in FIG. 1.

First, description will be made on a system for producing a raw material for a recycled resin composition in accordance with the present invention, i.e., a system used in a method for producing a raw material for a recycled resin composition.

The system for producing a raw material for a recycled resin composition shown in FIG. 1 is designed to heat and pressurize a mixture of a resin composition containing a thermosetting resin (hereinafter simply referred to as a "resin composition") and a solvent containing a monomer component constituting the thermosetting resin of the resin composition or a derivative of the monomer component (hereinafter simply referred to as a "solvent") to thereby bring the solvent into a supercritical state or a subcritical state. By doing so, the system obtains a treated recovery product containing a recycled resin formed of the thermosetting resin of the resin composition whose molecular weight is reduced (hereinafter simply referred to as a "recycled resin"). Some components of the treated recovery product are used as a raw material for a recycled resin composition (hereinafter referred to as a "raw recycled-resin-composition material").

In particular, it is a major feature of the present invention that a decomposition treatment of the thermosetting resin is performed by a continuous operation. The term "decomposition treatment" used herein includes a treatment carried out by a chemical decomposition and/or a treatment conducted by a physical solubilization. Furthermore, the continuous operation refers to a manner of operation as opposed to a batchwise operation. That is to say, the continuous operation refers to a manner of operation by which a resin composition and a material required for treating the same are continuously introduced into an apparatus in a specified ratio (flow rate) and are subjected to a continuous treatment, the treated recovery product being discharged continuously. This makes it possible to keep operation conditions uniform and maintain a speed of physical and chemical change of substances constant, thereby performing an operation in a so-called normal state. In contrast, the batchwise operation is a manner of operation by which a certain quantity of the resin composition is put into an apparatus and treated for a given time period on a treatment-by-treatment basis, the treated recovery product being discharged from the apparatus in a lump after completion of the intended treatment.

Accordingly, the present invention makes it possible to continuously and efficiently decompose and treat the thermosetting resin of the resin composition, recover the treated recovery product containing a recycled resin, a solid residue, a low-boiling-temperature component and the like, and reuse the recovery product as a raw material for plastics.

As shown in FIG. 1, the system 1 for producing a raw material for a recycled resin composition includes a decomposition reaction apparatus 2 for heating and pressurizing a mixture of a resin composition and a solvent (hereinafter simply referred to as a "mixture") to thereby decompose (i.e., solubilize in the solvent) a thermosetting resin of the resin composition through a continuous operation.

A cooling device 4, a first separating unit 51 serving as a solid-liquid separator and a second separating unit 52 serving as a gas-liquid separator are connected to a discharge side of the decomposition reaction apparatus 2 in the named sequence. Hereinafter, the decomposition reaction apparatus 2, the cooling device 4, the first separating unit 51 and the second separating unit 52 will be sequentially described in detail.

The decomposition reaction apparatus 2 includes a main reaction body 21 for decomposing the thermosetting resin and a supply unit 3 for supplying the mixture to the main reaction body 21.

The supply unit 3 includes a mixing device 31 for mixing the resin composition and the solvent and a pressurizing device 32 for forcedly feeding the mixture from the mixing device 31 to the main reaction body 21 (to an inlet portion 222 of a reactor 22 which will be set forth later).

A hopper 35 for receiving the resin composition is connected to the mixing device 31 by way of a shut-off valve 34. The resin composition received in the hopper 35 may be any form, e.g., a solid state, a liquid state or a semi-solid state, although not particularly limited thereto.

In case of using a liquid state resin composition, it is desirable to employ a device suitable for adding a liquid state material, such as a dropping device or a sprayer, in place of the hopper 35.

The mixing device 31 is not particularly limited as long as it has an ability to mix the resin composition and the solvent. Examples of the mixing device 31 include a screw mixing device and a mixing device provided with mechanism for performing a mixing operation by rotating a mixing vessel. More specific examples of the mixing device 31 include an agitation tank having anchor-type or ribbon-type agitator blades, a screw extruder and a co-kneader.

Introduction pipes 37 with shut-off valves 36 are connected to the mixing device 31 so that the solvent can be introduced into the mixing device 31 through the introduction pipes 37. Each of the introduction pipes 37 includes an inlet pipe 37a through which the solvent is returned from the below-mentioned second separating unit 52 to the mixing device 31 and an inlet pipe 37b through which the solvent is introduced into the mixing device 31 from the outside of the system 1. The shut-off valves 36 includes an opening and closing valve 36a provided in the inlet pipe 37a and an opening and closing valve 36b provided in the inlet pipe 37b.

The mixing device 31 of this type is connected to the pressurizing device 32 via a shut-off valve 33.

The pressurizing device 32 is a device that feeds the mixture from the mixing device 31 to the main reaction body 21 under pressure.

The pressurizing device 32 may be suitably selected according to the form of the mixture or the properties thereof such as a viscosity or the like. The pressurizing device 32 is not particularly limited as long as it can feed the mixture to the main reaction body 21 under pressure. In case of using a slurry state mixture, a pumping device such as a syringe pump, a plunger pump or a diaphragm pump can be employed as the pressurizing device 32. Furthermore, in case of using a paste state mixture of relatively large aggregated materials and liquid materials, a mechanically-operated feeding device such as a single-axis extruder or a dual-axis extruder can be employed as the pressurizing device 32.

Referring to FIG. 2, the main reaction body 21 includes a tube-type reactor 22 comprised of a spirally extending tubular body and a heater 23 for heating the tube-type reactor 22.

The tube-type reactor 22 is adapted to decompose the mixture while the latter circulates through a tubular passageway of the tube-type reactor 22. Furthermore, the afore-mentioned pressurizing device 32 is connected to one end (an upper end in FIG. 2) of the tube-type reactor 22 and the first separating unit 51 is coupled to the other end (a lower end in FIG. 2) of the tube-type reactor 22 via the cooling device 4.

That is to say, the tube-type reactor 22 is formed of a decomposition reaction section 221 that brings the solvent into a supercritical state or a subcritical state by heating and pressurizing the mixture moving therethrough and obtains a first treated recovery product containing a recycled resin formed of a thermosetting resin with a reduced molecular weight. Moreover, the tube-type reactor 22 is provided at one end with an introduction section 222 for introducing the mixture therethrough and at the other end with a discharge section 223 for discharging the first treated recovery product therethrough.

In other words, the tube-type reactor 22 includes the introduction section 222 for introducing the mixture therethrough, the decomposition reaction section 221 that brings the solvent into a supercritical state or a subcritical state by heating and pressurizing the mixture moving therethrough and obtains a first treated recovery product containing a recycled resin formed of the thermosetting resin whose molecular weight is reduced, and the discharge section 223 for discharging the first treated recovery product therethrough.

Since the tube-type reactor 22 extends spirally in a vertical direction, it is possible to increase the quantity of the mixture moving in a horizontal direction. As a result, it is possible to prevent solid components of the mixture in the tube-type reactor 22 from sinking down in a gravitational direction (downward direction) and clogging up an entrance or an exit of the tubular passageway of the tube-type reactor 22.

The decomposition reaction apparatus 2 of this type is designed to ensure that the tasks of introducing the mixture into the introduction section 222, decomposing the mixture in the decomposition reaction section 221 and discharging the first treated recovery product from the discharge section 223 are all performed continuously. This enables the thermosetting resin of the resin composition to be continuously decomposed in an efficient manner.

The main reaction body 21 as set forth above serves to introduce the mixture from the supply unit 3 into the introduction section 222, pressurize the mixture in the decomposition reaction section 221 by means of the pressurizing device 32 while heating the mixture with the heater 23, bring the solvent in the mixture into a supercritical state or a subcritical state, reduce a molecular weight of the thermosetting resin in the mixture, obtain a first treated recovery product and then discharge the recovery product from the discharge section 223 to the cooling device 4.

Assuming that the tube-type reactor 22 has a length of L(m) and a diameter of D(m), L/D is preferably in a range of 10 to 5000 and more preferably in a range of 20 to 2000. This makes it possible to keep the mixture in the tube-type reactor 22 at a temperature and pressure great enough to decompose the same, while securing a space time required in the decomposition treatment.

In contrast, if L/D is smaller than the lower limit value noted above, the linear velocity (flow velocity) of each of the resin composition and the solvent circulating through the tube-type reactor 22 shows a drastic reduction. For this reason, a spatiotemporal distribution becomes uneven and a degree of decomposition reaction becomes non-uniform from position to position in the tube. Further, it may sometimes be the case that precipitation of solid components occurs if the solid components are contained in the resin composition. Particularly, if the "D" value is too great, a tube-type reactor having an increased thickness needs to be used in order to secure a pressure resistance high enough to withstand the decomposition reaction. This may sometimes reduce heat transfer efficiency at the time of heating and cooling the tube-type reactor. On the other hand, if L/D exceeds the upper limit value stated above, the linear velocity (flow velocity) of each of the resin composition and the solvent flowing through the tube-type reactor 22 shows an increase. Thus, the spatiotemporal distribution becomes even and the degree of decomposition reaction becomes uniform in every position in the tube. Moreover, there is provided an advantage that precipitation of solid components can be avoided even if the solid components are contained in the resin composition. However, if the "D" value is too small, a pressure loss becomes high, which leaves a possibility that the solid components may clog up the tubular passageway of the tube-type reactor 22.

Furthermore, it is desirable that a stationary mixer be provided within the tube-type reactor 22. By doing so, it is possible either to assure accelerated mixing of the resin composition and the solvent or to prevent the resin composition and the solvent from being separated from each other in the mixture. This helps to prevent any sedimentation and accumulation of the solid components within the tube-type reactor 22, while enhancing decomposition treatment efficiency.

The cooling device 4 serves to cool the first treated recovery product of an elevated temperature, thereby enabling the below-mentioned first separating unit 51 to perform the solid-liquid separation. The cooling device 4 may be omitted if the first separating unit 51 is capable of performing the solid-liquid separation without having to use the same.

The first separating unit 51 is designed to separate the first treated recovery product into a recycled resin, a low-boiling-point component and a solid residue. Furthermore, the first separating unit 51 is capable of recovering the solid residue as a raw recycled-resin-composition material and is adapted to supply the recycled resin and the low-boiling-point component to the second separating unit 52.

The first separating unit 51 is not particularly limited as long as it has the function set forth above. For example, a device that takes advantage of a method such as cyclone separation, gravitational sedimentation, filtering, centrifugal separation or the like can be used as the first separating unit 51. This makes it possible to remove (or take away) the solid residue from the first treated recovery product.

The first separating unit 51 as stated above is connected to the second separating unit 52 serving as a gas-liquid separator by way of a shut-off valve 53.

The second separating unit 52 is adapted to receive object materials for the solid-liquid separation (predominantly composed of the recycled resin and the low-boiling-point component) and then separate the object materials into the recycled resin and the low-boiling-point component. Further, the second separating unit 52 is capable of recovering the recycled resin as a raw recycled-resin-composition material. Connected to the second separating unit 52 is a return line 54 through which the low-boiling-point component is returned back to the mixing device 31. Substances other than the recycled resin and the low-boiling-point component are discharged as waste liquid. It is possible to reuse the waste liquid as a raw recycled-resin-composition material.

The second separating unit 52 is not particularly limited as long as it has the function set forth above. For example, a device that takes advantage of a method such as simple distillation, vacuum distillation, fractional distillation, molecular distillation, steam distillation, extractive distillation or the like can be used as the second separating unit 52. This makes it possible to independently recover the low-boiling-point component and the recycled resin.

The first separating unit 51 and the second separating unit 52 are arbitrarily selected according to a reuse method of the first treated recovery product containing the recycled resin, the solid residue and the low-boiling-point component. One of the first separating unit 51 and the second separating unit 52 may be eliminated.

In case the solid-liquid separation is difficult to perform due to an increased viscosity of the object materials for solid-liquid separation or other reasons, the object materials for the solid-liquid separation may be diluted with a solvent. After the solid residue has been separated by a filtering operation such as pressure filtering, vacuum filtering or the like, the resultant filtrate may be further subjected to simple distillation or vacuum distillation to remove fractions in the filtrate, such as water or acetone, which has a lower boiling point than the solvent. Thereafter, the solvent may be distilled and removed by vacuum distillation or the like. In the event that the fractions contain substances having a boiling point similar to or greater than the boiling point of the solvent, multi-stage distillation may be performed by use of a distillation column.

The afore-mentioned method is used with no change in case the recycled resin, the solid residue and the low-boiling-point component are separated and recovered independently of one another. However, if one wishes to reuse a mixture of the recycled resin and the solid residue as a raw recycled-resin-composition material, it may be possible to omit the separation of the solid residue and perform only the separation of the low-boiling-point component to thereby separate and recover the mixture of the recycled resin and the solid residue apart from the low-boiling-point component. Moreover, in case the first treated recovery product obtained by the decomposition treatment is all reused as a raw recycled-resin-composition material, both the first separating unit 51 and the second separating unit 52 may be omitted and a mixture of the recycled resin, the solid residue and the low-boiling-point component may be used as a raw recycled-resin-composition material.

Now, description will be given to an operation of the system 1 for producing a raw material for a recycled resin composition, i.e., a method for producing a raw material for a recycled resin composition in accordance with the present invention.

The method for producing a raw material for a recycled resin composition in accordance with the present embodiment prepares a raw recycled-resin-composition material using the system 1 for producing a raw material for a recycled resin composition described above.

The method for producing a raw material for a recycled resin composition includes: (A) a supply step of continuously introducing a mixture from the supply unit 3 into the introduction section 222; (B) a decomposition treatment step of obtaining a first treated recovery product, which contains a recycled resin formed of a thermosetting resin with a reduced molecular weight, by heating and pressurizing the mixture in the decomposition reaction section 221 and bringing the solvent into a supercritical state or a subcritical state; and (C) a recovery step of continuously discharging the first treated recovery product from the discharge section 223 and recovering at least a part of the recovery product as a raw recycled-resin-composition material. Hereinafter, the steps (A), (B) and (C) will be described in sequence.

(A) Supply Step

-A1-

First, a mixture is continuously introduced from the supply unit 3 into the introduction section 222 of the main reaction body 21.

Stating more specifically, a resin composition containing a thermosetting resin is first mixed in the mixing device 31 with a solvent composed of a monomer component constituting the thermosetting resin or a component similar to the monomer component. At this time, the resin composition is supplied from the hopper 35 to the mixing device 31 via the shut-off valve 34 kept in an open state. Furthermore, the solvent is supplied from the introduction pipes 37 to the mixing device 31 via the shut-off valves 36 kept in an open state.

The resin composition containing the thermosetting resin is not particularly limited as long as it contains a thermosetting resin. An industrial waste or a general waste can be used as the resin composition containing the thermosetting resin.

Examples of the thermosetting resin contained in the resin composition include, but are not particularly limited to, e.g., phenol resins, epoxy resins, melamine resins, urea resins, polyester (unsaturated polyester) resins, polyimide resins, silicon resins, polyurethane resins, maleimide resins and cyanate, one of which may be used independently or two or more of which may be used in combination. Among them, it is particularly desirable in view of treatment efficiency to use, as the thermosetting resin, phenol resins such as a novorac resin, a resol resin and the like or epoxy resins such as a bisphenol A-type epoxy resin, an ortho-cresol novorac epoxy resin, a biphenyl-type epoxy resin, an aralkyl-type epoxy resin and the like. One of these resins may be used independently or two or more of them may be used in combination.

Furthermore, the resin composition may be composed of the thermosetting resin alone or may further contain substances other than the thermosetting resin.

In case the resin composition is composed of the thermosetting resin alone, the thermosetting resin may be in one of cured, semi-cured and uncured states or may be in the combination of two or more of these states. Moreover, the thermosetting resin may be a liquid material such as a solvent-containing varnish.

In case the resin composition contains substances other than the thermosetting resin, a substance whose molecular weight is not reduced by the decomposition reaction may be contained in the resin composition as the substances other than the thermosetting resin. Examples of such a substance include organic materials such as a thermoplastic resin and the like and inorganic materials such as glass, metal, metal compound and the like.

Therefore, it is possible to use, as the resin composition containing the thermosetting resin, a molded material or molded article containing fillers such as silica, glass fiber, wood powder and the like, a laminated plate formed by impregnating an inorganic base material such as a glass fabric or the like or an organic base material such as a paper, a fabric or the like with a resin, a metal-clad laminate formed by covering the laminated plate with a metal foil such as a copper foil or the like, and a plastic product such as a printed circuit board obtained by machining the metal-clad laminate.

In case the molded article or the plastic product is used as the resin composition containing the thermosetting resin, it is desirable to first pulverize solid block objects into powder and then supply the powder to the mixing device 31 through the hopper 35. In the event that the solid block objects are simultaneously pulverized and sheared with a shear force or other forces during pressurization in the pump 32 or treatment in the decomposition reaction apparatus 2, there is no need to preliminarily pulverize the solid block objects used as the resin composition and supply them to the hopper 35 in the form of powder.

In case of using a powdery resin composition, the particle size thereof is preferably equal to or smaller than 1000 μm. This makes it possible to increase decomposition treatment efficiency in a relatively simple manner. In contrast, if the particle size of the powdery resin composition is greater than 1000 μm, it is often the case that, depending on the treatment conditions, an increasing quantity of resin composition is not decomposed during the decomposition treatment.

In the meantime, the solvent is not particularly limited as long as it contains a monomer component constituting the afore-mentioned thermosetting resin or a derivative of the monomer component (hereinafter simply referred to as a "constituent monomer components") and has an ability to decompose the thermosetting resin, i.e., reduce the molecular weight of the thermosetting resin when brought into a supercritical state or a subcritical state. For example, a phenolic compound and a melamine compound can be used as the solvent.

The phenolic compound is not particularly limited as long as it is a compound in which at least one of hydrogen atoms bonded to carbon atoms of an aromatic ring is substituted by a hydroxyl group. Examples of the phenolic compound include mononuclear monophenolic compounds such as phenol, cresol, xylenol, alkyl-substituted phenol and the like, mononuclear polyphenolic compounds such as resorsin, catechol and the like, multinuclear monophenolic compounds such as aryl-substituted phenol, naphtol, hydroxyanthracene, hydroxyphenanthrene and the like, multinuclear polyphenolic compounds such as bisphenol A, bisphenol F, dihydroxybiphenyl and the like, and polynuclear compounds synthesized by reacting the mononuclear monophenolic compounds, the mononuclear polyphenolic compounds, the multinuclear monophenolic compounds and the multinuclear polyphenolic compounds with an aldehyde compound or a ketone compound. One of these compounds may be used independently or two or more of them may be used in combination.

As the melamine compound, it is preferred to use, e.g., melamine or compounds such as acetoguanamine, benzoguanamine and the like (compounds in which amino groups of melamine are substituted by other functional groups).

Among them, the phenolic compound is preferably used as the constituent monomer components for solvent. As the phenolic compound, it is preferred to use the mononuclear monophenolic compounds, particularly, phenol. This helps to increase decomposition treatment efficiency and assure cost reduction.

Furthermore, the solvent may be composed of the constituent monomer components alone or may further contain other components.

Examples of other components contained in the solvent include water, monoalcohols such as methanol, ethanol and the like, glycols such as ethylene glycol, propylene glycol and the like, ketones, ethers, esters, organic acids and acid anhydrides. One of these components may be used independently or two or more of them may be used in combination. Among them, it is preferred to use water as other components contained in the solvent, from a viewpoint of influence on the decomposition treatment and ease of procurement.

The constituent monomer components and other components are mixed preferably in a mixing ratio of 1 to 500 parts by weight of other components to 100 parts by weight of constituent monomer components and more preferably in a mixing ratio of 5 to 50 parts by weight of other components to 100 parts by weight of constituent monomer components. This makes it possible to increase the decomposition treatment speed in a relatively simple manner. In contrast, if the addition amount of other components is greater than the upper limit value noted above, the decomposition treatment speed may sometimes be decreased. On the other hand, if the addition amount of other components is smaller than the lower limit value stated above, it may also lead to a decrease in the decomposition treatment speed.

The resin composition and the solvent in the mixture are mixed preferably in a mixing ratio of 50 to 1000 parts by weight of the solvent to 100 parts by weight of the resin composition and more preferably in a mixing ratio of 100 to 400 parts by weight of the solvent to 100 parts by weight of the resin composition. This makes it possible to smoothly perform the decomposition treatment of the thermosetting resin in a relatively simple manner. In contrast, if the addition amount of solvent is smaller than the lower limit value stated above, it may sometimes be difficult to smoothly carry out the decomposition treatment. On the other hand, if the addition amount of solvent exceeds the upper limit value noted above, it may be the case that the energy required in a heating operation is increased without providing any appreciable advantage.

It may also be possible to add an acid or a catalyst to the mixture for the purpose of accelerating the decomposition treatment.

It is preferred that the catalyst be a base catalyst. This helps to alleviate problems, such as deterioration of electric characteristics and occurrence of corrosion, which would be encountered in the recycling process. The base catalyst is not particularly limited as long as it works as a base against the solvent and the thermosetting resin during the decomposition treatment. Various kinds of inorganic or organic base catalysts may be used as the catalyst.

Among them, inorganic base catalysts such as a hydroxide of alkaline metal, a hydroxide of alkaline earth metal and the like are suitable for use as the catalyst. Calcium hydroxide and magnesium hydroxide are more preferable in view of the fact that they have reduced influence on the electric characteristics of a resin.

The addition amount of catalyst is preferably 0.05 to 100 parts by weight and more preferably 0.1 to 10 parts by weight, based on 100 parts by weight of the resin composition containing the thermosetting resin. This makes it possible to accelerate the decomposition treatment in an effective manner. In contrast, if the addition amount of the catalyst is smaller than the lower limit value stated above, the characteristics of a recycled resin as recovered may sometimes be deteriorated. For example, in case the thermosetting resin is a phenol resin, there may be the case that hydroxyl groups are decreased by a side reaction. On the other hand, if the addition amount of catalyst exceeds the upper limit value noted above, it may be the case that the recycled resin composition using the recycled resin as recovered shows reduced electric characteristics.

Addition of the catalyst may be omitted if the decomposition treatment can be effectively performed without adding the catalyst. This provides an advantage in that there is no need to perform a catalyst-separating operation at the end of treatment.

It is preferred that the mixture obtained by the mixing device 31 has a viscosity of 0.001 to 1000 Pa·s at a temperature of 23±0.2° C. Particularly, it is preferred that the mixture having such a viscosity be in a slurry state. This ensures that the decomposition treatment efficiency can be increased in a relatively simple manner. In contrast, if the viscosity of the mixture is smaller than 0.001 Pa·s, the recycled resin as recovered tends to show a reduction in its molecular weight. If the viscosity of the mixture exceeds 1000 Pa·s, there may be the case that clogging occurs within the tube-type reactor 22 and that the flowability or curability of the recycled resin as recovered is deteriorated.

The viscosity of the mixture noted above refers to a viscosity obtained in a slurry state and at a temperature of 23±0.2° C. It is preferred to use, as a viscometer, a cone-plate type rotary viscometer prescribed in JIS-Z8803, "liquid viscosity measuring method". The measuring method is based on JIS-K7117-2, "plastics—a resin in the form of liquid, emulsion or dispersion—a viscosity measuring method with a rotary viscometer at a static shearing speed". It is preferred to use a method of measuring a static shearing speed, according to which measurement is carried out by controlling a rotating speed constant in a temperature control system.

-A2-

The mixture obtained in this way is introduced from the mixing device 31 into the introduction section 222 via the opened shut-off valve 33 by driving the pump 32.

(B) Decomposition Treatment Step

The mixture of resin composition and solvent is supplied to the decomposition reaction section 221 via the introduction section 222. The mixture is then pressurized by the pressurizing device 32 and heated by the heater 23 so that the solvent in the mixture can be brought into a supercritical state or a subcritical state. By doing so, the thermosetting resin in the mixture has a reduced molecular weight, thus producing a first treated recovery product which contains a recycled resin.

At this time, the treatment temperature in the decomposition reaction section 221 is arbitrarily selected according to the kind of the resin composition and so forth. The treatment temperature is preferably in a range of 200 to 500° C. and more preferably in a range of 200 to 450° C. This ensures that the decomposition treatment can be stably performed within a relatively short period of time. In contrast, if the treatment temperature is lower than the lower limit value noted above, it may be the case that a long period of time is required for the decomposition treatment or a difficulty is encountered in the decomposition treatment. On the other hand, if the treatment temperature exceeds the upper limit value stated above, irregular reaction is apt to occur in the decomposition reaction section 221 due largely to heat radical.

It is preferred that the pressure in the decomposition reaction section 221 (namely, the pressure applied to the mixture of resin composition and solvent) be controlled to a pressure suitable for the decomposition treatment. More specifically, the pressure in the decomposition reaction section 221 is preferably in a range of 1 to 60 MPa and more preferably in a range of 2 to 45 MPa. This helps to save costs and perform the decomposition treatment in an efficient manner. In contrast, if the pressure is smaller than the lower limit value noted above, there may be the case that the decomposition treatment does not go forward due to evaporation of the solvent or other reasons. On the other hand, if the pressure exceeds the upper limit value stated above, a great deal of expense is involved in making a pressure resistant design.

The space time in the decomposition reaction section 221 may be arbitrarily selected according to other treatment conditions and is preferably in a range of 1 to 60 min. This helps to improve a yield rate of the recycled resin whose molecular weight is suitable for recycling. In contrast, if the space time is shorter than the lower limit value noted above, there is a possibility that the decomposition treatment occurs insufficiently. On the other hand, if the space time exceeds the upper limit value stated above, there is a possibility that the molecular weight of the recycled resin is excessively reduced or the production efficiency is deteriorated.

The term "space time" as used herein is defined by V/v where the "V" stands for a volume ($m^3$) of the tube-type reactor and the "v" represents a flow rate ($m^3$/min) of the mixture of the resin composition and the solvent flowing through the tube-type reactor. Furthermore, the space time in the continuous reactor corresponds to a reaction time in a batch-type reactor.

(C) Recovery Step

The first treated recovery product produced by the decomposition treatment in the decomposition reaction section 221 is discharged from the discharge section 223 to the cooling device 4.

The first treated recovery product cooled in the cooling device 4 is separated (extracted) into a mixture of the recycled resin and low-boiling-point component and a solid residue in the first separating unit 51. The first treated recovery product from which the solid residue has been removed in the first separating unit 51, i.e., the mixture of recycled resin and low-boiling-point component, is supplied to the second separating unit 52 and the solid residue is recovered as a raw recycled-resin-composition material.

The first treated recovery product from which the solid residue has been removed in the first separating unit 51 is separated into the recycled resin and the low-boiling-point component in the second separating unit 52. The recycled resin is recovered as a raw recycled-resin-composition material and the low-boiling-point component is returned back to the supply unit 3 via the return line 35 so that it can be reused as the solvent.

In this way, the solid residue recovered in the first separating unit 51 and the recycled resin and the low-boiling-point component recovered in the second separating unit 52 are mainly obtained as the raw recycled-resin-composition material.

The recycled resin obtained as the raw recycled-resin-composition material consists predominantly of a thermosetting resin with a reduced molecular weight. It is preferred that the recycled resin contains 50 percent by weight or more of a recycled resin whose weight-average molecular weight is in a range of 200 to 10000. This makes it possible to obtain a recycled resin suitable for use as the raw recycled-resin-composition material.

The recycled resin having a weight-average molecular weight of 200 to 10000 may possibly contain an organic filler or a base material of the resin composition, a decomposed substance thereof and so forth, in addition to the thermosetting resin with a reduced molecular weight. Moreover, the recycled resin obtained as the raw recycled-resin-composition material may sometimes contain a recycled resin having the weight-average molecular weight of 10000 or more, as well as the recycled resin having the weight-average molecular weight of 200 to 10000.

In case a typical thermosetting resin has been subjected to the decomposition treatment, the recycled resin having a weight-average molecular weight of 200 to 10000 corresponds to about 2 to 100 nuclei of a monomer constituting the thermosetting resin.

More specifically, representative examples of the recycled resin obtained by reducing the molecular weight of the thermosetting resin include a phenol resin or oligomer in which nuclei of a phenol skeleton are bonded to one another by a methylene bond in case of the thermosetting resin of the resin composition being a phenol resin. Other examples of the recycled resin include: a melamine resin or oligomer in which nuclei of a melamine skeleton are bonded to one another by a methylene bond in case of the thermosetting resin of the resin composition being a melamine resin; a urea resin or oligomer in which nuclei of a urea skeleton are bonded to one another by a methylene bond in case of the thermosetting resin of the resin composition being a urea resin; resins or oligomers of phenol, melamine and urea in case of the resin composition containing a phenol resin, a melamine resin and a urea resin as the thermosetting resin; and a compound having a structure in which a phenol skeleton, a melamine skeleton and a urea skeleton are copolymerized by a methylene bond in case of the resin composition containing a phenol resin, a melamine resin and a urea resin as the thermosetting resin. These recycled resins are exemplary ones. The recycled resin obtained as a raw recycled-resin-composition material is not limited to any particular resin.

The recycled resin has a molecular weight substantially equal to that of a prepolymer used in producing a formed article containing a thermosetting resin. Thus, if necessary, the recycled resin may be refined and reused as a chemical raw material (prepolymer) for a formed article and the like whose raw material is a thermosetting resin.

Typically, the solid residue obtained as a raw recycled-resin-composition material is mainly composed of an undecomposed component of the resin composition, a carbonized polymer product of the resin composition, a filler contained in the resin composition and a base catalyst.

The solid residue of this type may be reused, e.g., as a filler or base material for a composite resin material composed of a thermosetting resin or as a resin composition or base material for a roadbed material, glass and cement.

The low-boiling-point component obtained as a raw recycled-resin-composition material contains a solvent, a compound of reduced molecular weight generated at the time of decomposition of the resin composition, a dilution solvent arbitrarily used in the process of solid-liquid separation.

The low-boiling-point component of this type is preferably returned back to the supply unit 3 and reused as a solvent, as is the case in the present embodiment. Alternatively, the low-boiling-point component may be reused in an application where a thermosetting resin is generally used as a raw material. As an example, the low-boiling-point component may be reused as a raw material for a synthetic resin. In this case, it may be possible to extract and use only a desired fraction of the low-boiling-point component or to newly add a solvent such as a phenol compound or water to the low-boiling-point component.

Moreover, it may also be possible to recycle in a lump the entirety of the first treated recovery product obtained by the decomposition treatment. For example, while kept in a state that contains the solid residue, the first treated recovery product may be reused as a raw recycled-resin-composition material in an application where a thermosetting resin is used as raw material.

Second Embodiment

Next, a second embodiment of the present invention will be described with reference to FIG. 3.

Figure 3:
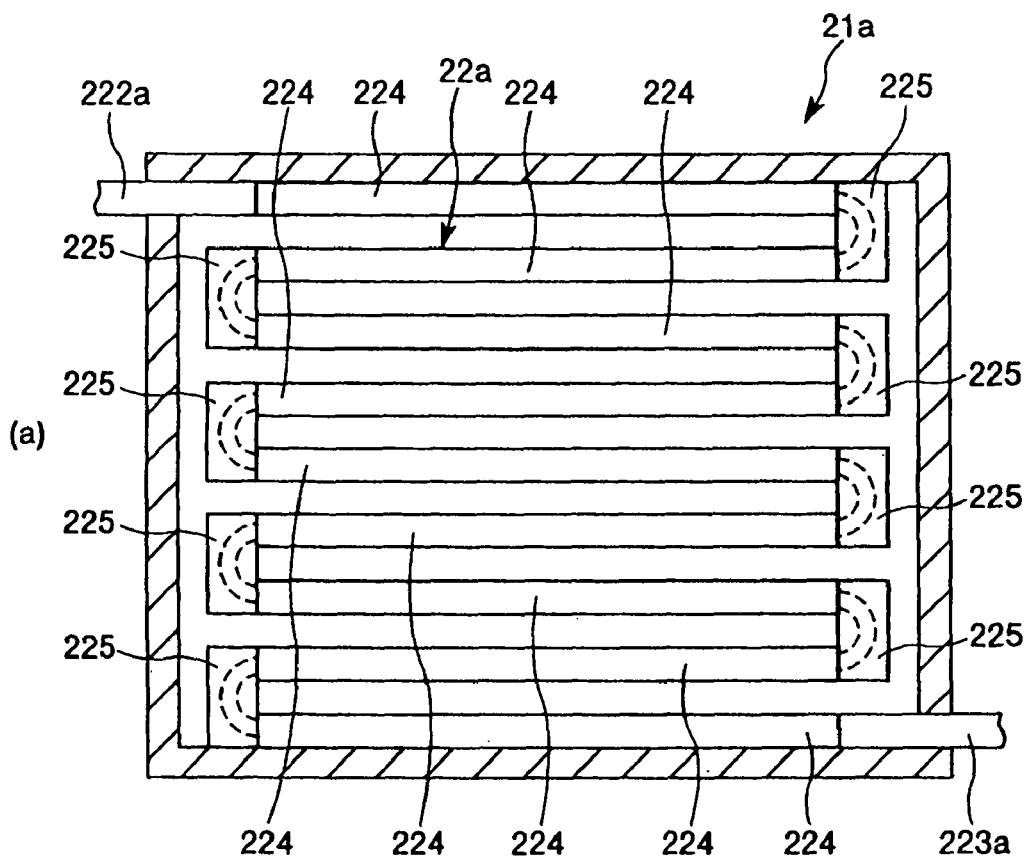
FIG. 3 is a section view showing a main reaction body of a decomposition reaction apparatus provided in a system for producing a raw material for a recycled resin composition in accordance with a second embodiment of the present invention.
Figure 3:
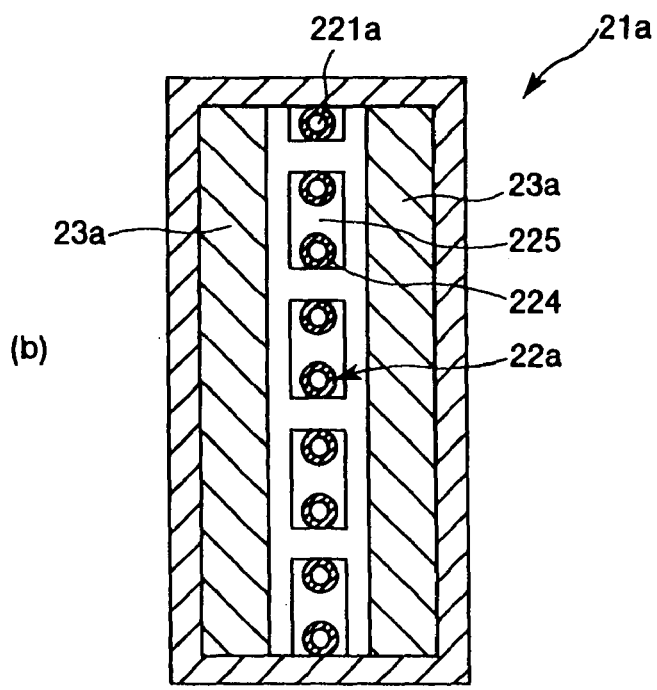

FIG. 3 is a section view showing a main reaction body of a decomposition reaction apparatus provided in a system for producing a raw material for a recycled resin composition in accordance with a second embodiment of the present invention.

Hereinafter, the second embodiment will be described by placing an emphasis on the points differing from the first embodiment set forth above, but description will be omitted on the same points.

The system for producing a raw material for a recycled resin composition in accordance with the present embodiment is the same as the system of the first embodiment described above, except a difference in the configuration of the main reaction body.

That is to say, the system for producing a raw material for a recycled resin composition in accordance with the present embodiment is provided with a main reaction body 21a as shown in FIG. 3, in place of the main reaction body 21 employed in the system of the first embodiment.

Referring to FIG. 3, the main reaction body 21a includes a tube-type reactor 22a and a heater 23a for heating the tube-type reactor 22a.

The tube-type reactor 22a includes a plurality of rectilinearly extending tubular members 224 and a plurality of connecting members 225 for interconnecting the tubular members 224. The tube-type reactor 22a is adapted to allow the mixture to circulate therethrough.

The tubular members 224 and the connecting members 225 are provided in such a manner that they can be separated from each other. Thus, in case the mixture or the first treated recovery product is stuck to the tubular members 224 or the connecting members 225 or in case the tubular members 224 or the connecting members 225 are damaged, the tubular members 224 or the connecting members 225 can be removed from the main reaction body 21a, which makes it easy to conduct maintenance such as repair or replacement.

The tube-type reactor 22a is designed to receive the mixture at one end thereof (an upper end in FIG. 3) and discharge the first treated recovery product at the other end thereof (a lower end in FIG. 3).

That is to say, the tube-type reactor 22a is formed of a decomposition reaction section 221a that brings the solvent into a supercritical state or a subcritical state by heating and pressurizing the mixture moving therethrough and obtains a first treated recovery product containing a recycled resin formed of a thermosetting resin with a reduced molecular weight. Moreover, the tube-type reactor 22a is provided at one end with an introduction section 222a for introducing the mixture therethrough and at the other end with a discharge section 223a for discharging the first treated recovery product therethrough.

In other words, the main reaction body 21a includes the introduction section 222a for introducing the mixture therethrough, the decomposition reaction section 221a that brings the solvent into a supercritical state or a subcritical state by heating and pressurizing the mixture moving therethrough and obtains a first treated recovery product containing a recycled resin formed of a thermosetting resin with a reduced molecular weight, and the discharge section 223a for discharging the first treated recovery product therethrough.

Just like the main reaction body 21 of the first embodiment described earlier, the main reaction body 21a is designed to ensure that the tasks of introducing the mixture into the introduction section 222a, decomposing the mixture in the decomposition reaction section 221a and discharging the first treated recovery product from the discharge section 223a are all performed continuously. This enables the thermosetting resin of the resin composition to be continuously decomposed in an efficient manner.

It is preferred that the tube-type reactor 22a has a tubular passageway extending along the same horizontal plane. This helps to prevent solid components of the mixture in the tube-type reactor 22a from sinking down in a gravitational direction (downward direction) and clogging up an entrance or an exit of the tubular passageway of the tube-type reactor 22a.

Third Embodiment

Next, a third embodiment of the present invention will be described with reference to FIG. 4.

Figure 4:
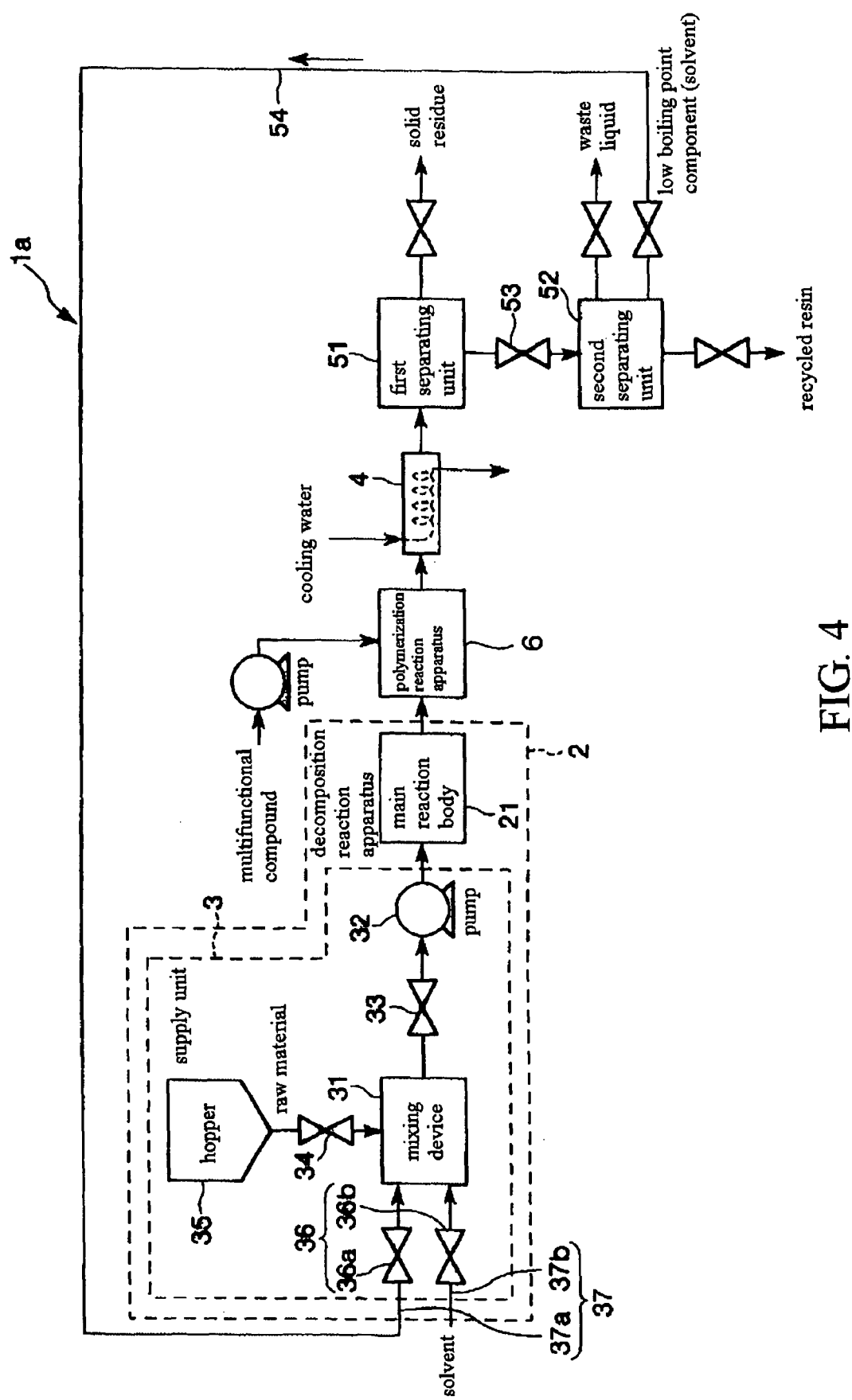
FIG. 4 is a schematic configuration diagram of a system for producing a raw material for a recycled resin composition in accordance with a third embodiment of the present invention.

FIG. 4 is a schematic configuration diagram of a system for producing a raw material for a recycled resin composition in accordance with the third embodiment of the present invention.

Hereinafter, the third embodiment will be described by placing an emphasis on the points differing from the first embodiment set forth above, but description will be omitted on the same points. In FIG. 4, the same constituent parts as those of the system of the first embodiment will be designated by like reference numerals.

The system 1a for producing a raw material for a recycled resin composition in accordance with the present embodiment is the same as the system of the first embodiment described above, except that a polymerization reaction apparatus 6 is provided between the decomposition reaction apparatus 2 and the cooling device 4.

That is to say, the system 1a of the present embodiment is provided with the polymerization reaction apparatus 6 arranged between the decomposition reaction apparatus 2 and the cooling device 4, as shown in FIG. 4.

The polymerization reaction apparatus 6 serves to introduce a multifunctional compound together with the first treated recovery product and polymerize the recycled resin in the first treated recovery product with the multifunctional compound.

The main reaction body 21 of the decomposition reaction apparatus 2 is connected to an introduction side of the polymerization reaction apparatus 6 so that the first treated recovery product can be introduced into the polymerization reaction apparatus 6. Also connected to the introduction side of the polymerization reaction apparatus 6 is a pressurizing device 7 that introduces the multifunctional compound into the polymerization reaction apparatus 6 under pressure. On the other hand, the cooling device 4 is connected to a discharge side of the polymerization reaction apparatus 6 so that the a second treated recovery product containing a recycled resin with an increased molecular weight can be supplied from the polymerization reaction apparatus 6 to the cooling device 4.

The multifunctional compound is not particularly limited as long as it can react with the recycled resin of the first treated recovery product (mainly, monomer or oligomer) to increase the molecular weight of the recycled resin. For example, an aldehyde compound may be suitably used as the multifunctional compound.

Examples of the aldehyde compound include formaldehyde, paraform, trioxane, an aldehyde source compound such as hexamethylenetetramine, and an aqueous solution thereof, one of which may be used independently or two or more of which may be used in combination.

The addition amount (dosage) of the multifunctional compound is preferably in a range of 1 to 25 parts by weight and more preferably in a range of 1 to 15 parts by weight, based on 100 parts by weight of the thermosetting resin in the resin composition. This makes it possible to perform the polymerization reaction treatment in a relatively simple and reliable manner. In contrast, if the addition amount of multifunctional compound is smaller than the lower limit value noted above, it may be the case that no appreciable effect is attained in respect of the polymerization reaction (molecular weight increasing reaction). On the other hand, if the addition amount of multifunctional compound exceeds the upper limit value stated above, there may be the case that, due to gellation of the recycled resin, the recovery rate of the recycled resin is decreased and the reactor (polymerization reaction section) is clogged to thereby hinder a stable operation.

The polymerization reaction apparatus 6 includes a polymerization reaction section that polymerizes the recycled resin and the multifunctional compound. As the recycled resin and the multifunctional compound are introduced into the polymerization reaction section, the polymerization reaction in the polymerization reaction section and the discharge of the second treated recovery product therefrom are all performed continuously.

In this regard, an apparatus of the same structure as the main reaction body 21 of the first embodiment or the main reaction body 21a of the second embodiment may be used as the polymerization reaction apparatus 6. In this case, the decomposition reaction section 221 of the main reaction body 21 or the decomposition reaction section 221a of the main reaction body 21a constitutes the polymerization reaction section.

The pressurizing device 7 serves to supply the multifunctional compound from the outside to the polymerization reaction apparatus 6 under pressure.

The pressurizing device 7 may be suitably selected according to the form of the multifunctional compound (e.g., liquid form, solution form or solid-containing slurry form) or the properties thereof such as a viscosity or the like. The pressurizing device 7 is not particularly limited as long as it can feed the multifunctional compound to the polymerization reaction apparatus 6 under pressure. For example, a pumping device such as a syringe pump, a plunger pump or a diaphragm pump can be employed as the pressurizing device 7.

The treatment temperature in the polymerization reaction section may be arbitrarily selected according to the kind of thermosetting resin in the resin composition. More specifically, the treatment temperature is preferably in a range of 100 to 400° C. and more preferably in a range of 150 to 300° C. This makes it possible to highly polymerize the recycled resin within a relatively short period of time and in an efficient manner. In contrast, if the treatment temperature is lower than the lower limit value noted above, it may be the case that, depending on the kind of thermosetting resin, a long period of time is required for the polymerization reaction (high polymerization) treatment or a difficulty is encountered in the polymerization reaction. On the other hand, if the treatment temperature exceeds the upper limit value stated above, irregular reaction is apt to occur due largely to heat radical or the molecular weight of the recycled resin is decreased, depending on the kind of thermosetting resin.

The heating method is not particularly limited as long as it can achieve the treatment temperature noted above. The heating in the polymerization reaction section may be omitted if the treatment temperature in the polymerization reaction section is lower than the treatment temperature in the decomposition reaction section 221 of the main reaction body 21. In this case, the first treated recovery product discharged from the main reaction body 21 may need to be cooled down or kept warm, thereby ensuring that the first treated recovery product is introduced into the polymerization reaction section at a temperature suitable for the polymerization reaction.

Furthermore, it is preferred that the pressure in the polymerization reaction section be controlled to a pressure suitable for the polymerization reaction. More specifically, the pressure in the polymerization reaction section is preferably equal to or smaller than 60 MPa (i.e., in a range of from an atmospheric pressure to 60 Mpa) and more preferably in a range of from an atmospheric pressure to 30 MPa. This helps to save costs and perform the polymerization reaction in an efficient manner. In contrast, if the pressure is smaller than the lower limit value noted above, there may be the case that the polymerization reaction does not go forward due to evaporation of the solvent or the multifunctional compound. On the other hand, if the pressure exceeds the upper limit value stated above, a great deal of expense is involved in making a pressure resistant design.

The space time in the polymerization reaction section may be arbitrarily selected according to other treatment conditions and is preferably in a range of 1 to 60 min. This helps to improve a yield rate of the recycled resin whose molecular weight is suitable for recycling. In contrast, if the space time is shorter than the lower limit value noted above, there is a possibility that the high polymerization of the recycled resin may not be fully completed. On the other hand, if the space time exceeds the upper limit value stated above, there is a possibility that the recycled resin is excessively polymerized and gelated or the production efficiency is deteriorated.

In general, the recycled resin highly polymerized by the polymerization reaction apparatus 6 has a molecular weight of 200 to 100,000 and is mainly composed of a resin component whose molecular weight distribution (Mw/Mn) is preferably in a range of 2.0 to 15 and more preferably in a range of 3.0 to 10. In this regard, the molecular weight of a major component of the recycled resin refers to a weight-average molecular weight (Mw).

The recycled resin highly polymerized in this manner has a molecular weight substantially equal to that of a chemical raw material (prepolymer) which is used in producing a resin composition containing a thermosetting resin. Thus, the recycled resin may be reused as a prepolymer by refining the same if necessary. Furthermore, the meaning that the recycled resin is mainly composed of a resin component having a molecular weight of 200 to 100,000 is that the recycled resin contains 50 percent by weight or more of the resin component of this molecular weight. However, the recycled resin contains a resin component having a molecular weight of greater than 100,000, as well as the major resin component having the above-noted molecular weight. In case a typical thermosetting resin is used, the resin component having a molecular weight of 200 to 100,000 corresponds to about 2 to 1,000 nuclei of a raw monomer thereof. Moreover, there may be the case that the recycled resin mainly composed of a resin component having a molecular weight of 200 to 100,000 contains a component obtained from an organic filler or base material contained in the resin component, as well as the component obtained from the thermosetting resin in the resin composition.

Furthermore, the highly polymerized recycled resin may be of a structure obtained by polymerizing one or more kind of recycled resin contained in the first treated recovery product with the multifunctional compound.

Fourth Embodiment

Next, a fourth embodiment of the present invention will be described with reference to FIG. 5.

Figure 5:
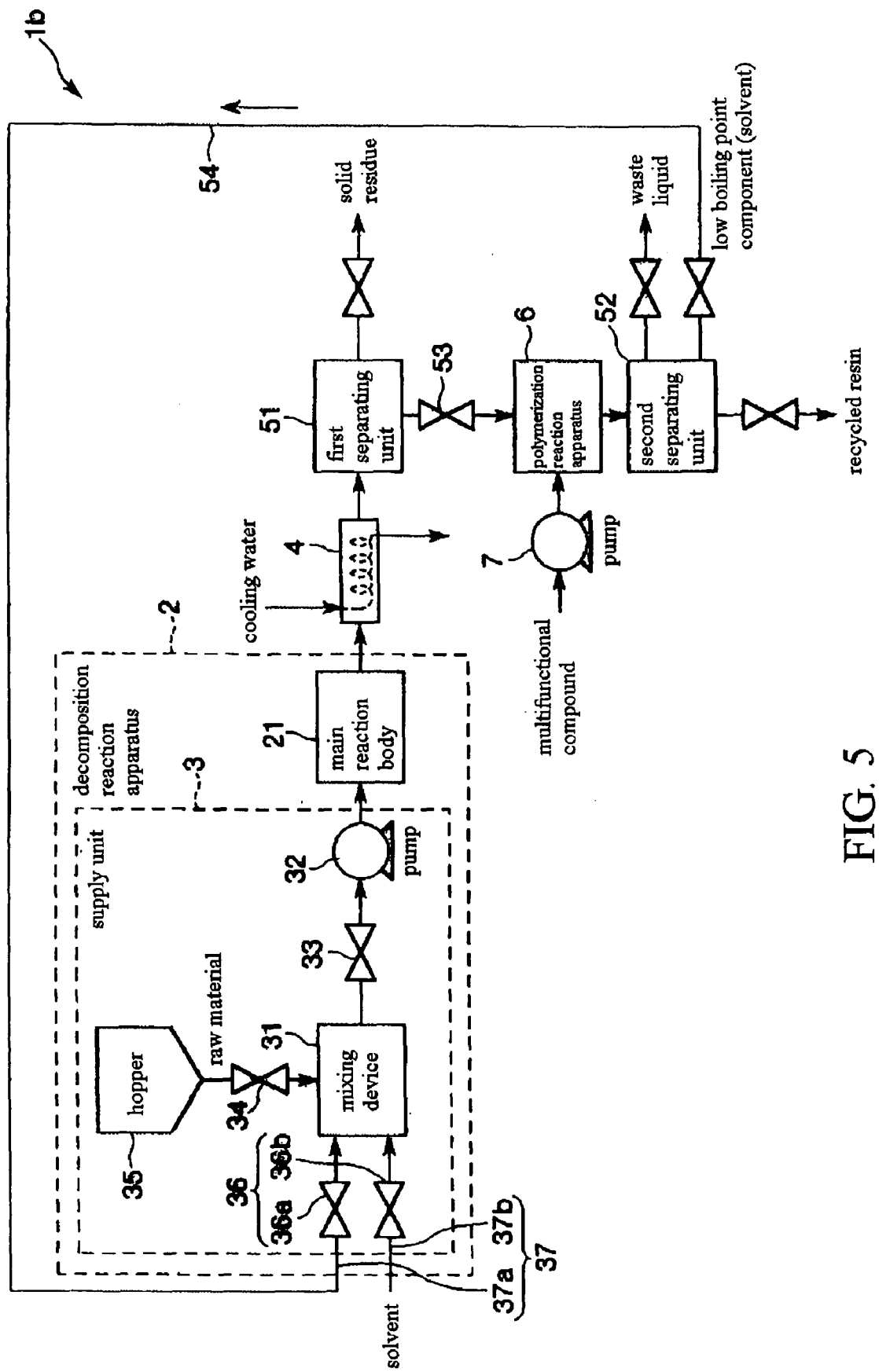
FIG. 5 is a schematic configuration diagram of a system for producing a raw material for a recycled resin composition in accordance with a fourth embodiment of the present invention.

FIG. 5 is a schematic configuration diagram of a system for producing a raw material for a recycled resin composition in accordance with the fourth embodiment of the present invention.

Hereinafter, the fourth embodiment will be described by placing an emphasis on the points differing from the first and third embodiments set forth above, but description will be omitted on the same points. In FIG. 5, the same constituent parts as those of the system of the first or third embodiment will be designated by like reference numerals.

The system 1b for producing a raw material for a recycled resin composition in accordance with the present embodiment is the same as the system 1a of the third embodiment described above, except that the polymerization reaction apparatus 6 is arranged between the first separating unit 51 and the second separating unit 52.

That is to say, the first separating unit 51 and the second separating unit 52 are connected to each other through the polymerization reaction apparatus 6. In other words, the system 1b for producing a raw material for a recycled resin composition includes the first separating unit 51 for separating and removing a solid residue from a first treated recovery product discharged by the decomposition reaction apparatus 2 and the second separating unit 52 for separating and extracting a recycled resin and a low-boiling-point component of the same ingredient as the solvent from the first treated recovery product from which the solid residue has been removed. The polymerization reaction apparatus 6 is provided between the first separating unit 51 and the second separating unit 52.

This makes it possible to efficiently separate and extract the solid residue before the viscosity of the recycled resin is increased by the high-polymerization in the polymerization reaction apparatus 6 to thereby reduce solid-liquid separation efficiency.

Although preferred embodiments of the present invention have been described hereinabove, the present invention is not limited thereto.

For example, individual parts that constitute the decomposition reaction apparatus and the system for producing a raw material for a recycled resin composition in accordance with the present invention may be substituted by arbitrary parts exercising the same functions. It may also be possible to add other arrangements thereto.

Although the decomposition reaction section is composed of the tube-type reactor as shown in FIG. 2 or 3 in the first to fourth embodiments described above, the decomposition reaction section is not limited thereto as long as it has an ability to continuously decompose the thermosetting resin contained in the resin composition. That is to say, the decomposition reaction section may be composed of flow type reactors including various kinds of tube-type reactors and various kinds of tank-type reactors. It is however preferred that the tube-type reactor shown in FIG. 2 or 3 be used among the flow type reactors.

In the event that the flow type reactors are used as the reactor constituting the decomposition reaction section, the temperature within the decomposition reaction section needs not to be kept uniform but may differ, e.g., in a front stage and a rear stage of the decomposition reaction section. In this case, the solvent and the resin composition can be warmed up or swollen in the front stage and a pretreatment for smooth low-polymerization can be performed in the rear stage. If necessary, a temperature gradient or a temperature distribution may be set in the rear stage.

Although the mixture of the resin composition and the solvent is supplied to the introduction section in the first to fourth embodiments described above, it may be possible to separately supply the resin composition and the solvent to the introduction section. In other words, the mixing device 31 may be omitted. It may also be possible to mix the resin composition and the solvent within the decomposition reaction section.

Although the resin composition and the solvent are conveyed within the reaction apparatus by the pressure of the pressurizing device 32 such as a pump in the first to fourth embodiments described above, a single-axis screw or a double-axis screw for generating a shear force or an agitating device may be optionally provided within the decomposition reaction section to thereby convey the resin composition and the solvent therethrough.

The method of heating the resin composition and the solvent within the decomposition reaction section is not limited to the one employed in the first to fourth embodiments described above. Various kinds of other heating methods may be used for that purpose. In case the treatment temperature is up to 300° C. or so, it is preferred in view of temperature controllability that the heating is performed by use of a heating medium. In case the treatment temperature is far greater than 300° C., it is preferred to use a direct heating means or other like means.

Furthermore, the polymerization reaction apparatus is not limited to the one employed in the third and fourth embodiments described above but may have the same structure as the afore-mentioned decomposition reactor.

Although the recycled resin (treated recovery product) and the multifunctional compound are separately supplied to the polymerization reaction apparatus in the third and fourth embodiments described above, it may be possible, if necessary, to premix the recycled resin or the first treated recovery product with the multifunctional compound and supply the premixture to the polymerization reaction apparatus. In this case, the means for premixing the recycled resin or the first treated recovery product with the multifunctional compound is not particularly limited and may be, e.g., a mixer adapted for static mixing operation or an agitator for performing mechanical agitation with agitating blades.

Although the first treated recovery product obtained by the decomposition reaction apparatus is separated into the recycled resin, the low-boiling-point component and the solid residue in the first to fourth embodiments described above, the first treated recovery product obtained by the decomposition reaction apparatus may be directly used as a raw recycled-resin-composition material without going through the separation process. In this case, there is no need to use the first separating unit 51 and the second separating unit 52.

EXPERIMENTAL EXAMPLES

Next, concrete experimental examples of the present invention will be described.

Example 1

-Treatment of Phenol Resin Molded Material-

A solvent consisting of 650 g of phenol and 100 g of water and a base catalyst consisting of 12.5 g of calcium hydroxide were added to 250 g of a cured product of general-purpose phenol resin molded material ("PM-8200" manufactured by Sumitomo Bakelite Company Limited) which is pulverized and sieved to have a particle size of 750 μm or less. A slurry mixture was prepared by mixing the solvent, the catalyst and the cured product for 30 minutes. The slurry mixture has a viscosity of 0.01 Pa·s which is measured at 23° C. using an E-type viscometer manufactured by Tokyo Instrument, Inc.

Subsequently, a system for producing a raw material for a recycled resin composition, which includes a slurry pump with a maximum discharge quantity of 6 L/h and a maximum discharge pressure of 15 MPa and a tube-type reactor made of a Hastelloy C-276 (registered trademark) tube having an inner diameter of 6.2 mm and a total length of 13.4 m, was set to achieve an in-reactor temperature (treatment temperature) of 300° C., a space time of 20 minutes and an in-reactor pressure (pressure within a decomposition reaction section) of 10 MPa. The slurry mixture was supplied to the tube-type reactor and decomposed through a continuous operation. Thereafter, a solid residue was vacuum-filtered and water was removed from a filtrate by ambient-pressure distillation. A low-boiling-point component containing phenol was then fractionated by vacuum distillation, finally taking out a recycled resin.

Through the above operations, 297 g of a recycled resin, 65 g of a recovered solid residue and 488 g of a low-boiling-point component were obtained. The recycled resin had a weight-average molecular weight (Mw) of 3010, when analyzed by Gel Permeation Chromatography (hereinafter called "GPC" by its acronym), and a hydroxyl group equivalent of 126.

In the process of measuring the hydroxyl group equivalent, 10 ml of dioxane was first added to 1.5 g of the recycled resin and the temperature was elevated to 60° C. to dissolve the recycled resin. The mixture of dioxane and recycled resin was cooled down to a room temperature and then to 0° C. after 10 ml of 1.5M toluene solution of acetyl chloride has been added thereto. At the end of such a cooling operation, 2 ml of pyridine was added to the mixture of dioxane and recycled resin which in turn is heated for one hour. Then, 25 ml of pure water was added to the mixture and surplus acetyl chloride was decomposed in ice water for 30 minutes while stirring the mixture. In order to prevent emulsification, 25 ml of acetone was added to the mixture. This solution was titrated with normal solution of 0.5 mol/L sodium hydroxide-alcohol (a product manufactured by Kishida Co., Ltd.). A hydroxyl group equivalent was calculated from the titration amount.

Example 2

-Treatment of Phenol Resin Molded Material through Reuse- of Low-Boiling-Point Component Essentially the same operations as in Example 1 were performed according to the formulation shown in Table 1, except the use of 500 g of phenol in place of 650 g of phenol as used in Example 1 and the use of 150 g of a low-boiling-point component obtained in Example 1. The results are shown in Table 1.

Table 1

Example 3

-Treatment of Phenol Resin Molded Material with No Separation of Solid Residue-

A solvent consisting of 600 g of phenol, 50 g of phenol novorac ("PR-51714" manufactured by Sumitomo Bakelite Company Limited), 100 g of water and 10 g of ethylene glycol and a base catalyst consisting of 12.5 g of magnesium hydroxide were added to 250 g of a cured product of general-purpose phenol resin molded material ("PM-8200" manufactured by Sumitomo Bakelite Company Limited) which was pulverized and sieved to have a particle size of 750 μm or less. A slurry mixture was prepared by mixing the solvent, the catalyst and the cured product for 30 minutes. The slurry mixture has a viscosity of 0.01 Pa·s which was measured at 23° C. using an E-type viscometer manufactured by Tokyo Instrument, Inc.

Subsequently, the same system as used in Example 1 was set to achieve an in-reactor temperature (temperature within a decomposition reaction section) of 300° C., a space time of 20 minutes and an in-reactor pressure (pressure within the decomposition reaction section) of 10 MPa. The slurry mixture was supplied to the tube-type reactor and decomposed through a continuous operation. Thereafter, water was removed from the slurry mixture by ambient-pressure distillation. A low-boiling-point component containing phenol was then fractionated by vacuum distillation, finally taking out a mixture of recycled resin and solid residue.

Through the above operations, 376 g of a mixture of the recycled resin and the solid residue and 479 g of a low-boiling-point component were obtained. A ratio of the recycled resin to the solid residue was investigated by sampling a small part of the mixture of the recycled resin and the solid residue. The investigation showed a ratio of 23 parts by weight of the solid residue to 100 parts by weight of the recycled resin. Furthermore, the recycled resin had a weight-average molecular weight (Mw) of 3130 and a hydroxyl group equivalent of 135.

Examples 4 to 9

A cured product of a phenol resin molded material and a cured product of an epoxy resin molded material were treated according to the formulation and the conditions shown in Table 1. The results are noted in Table 1.

Comparative Example 1

-Treatment in Autoclave of Phenol Resin Molded Material-

A solvent consisting of 650 g of phenol and 100 g of water and a base catalyst consisting of 12.5 g of calcium hydroxide were added to 250 g of a cured product of general-purpose phenol resin molded material ("PM-8200" manufactured by Sumitomo Bakelite Company Limited) which is pulverized and sieved to have a particle size of 750 μm or less. A slurry mixture was prepared by mixing the solvent, the catalyst and the cured product for 30 minutes. The slurry mixture had a viscosity of 0.01 Pa·s which is measured at 23° C. using an E-type viscometer manufactured by Tokyo Instrument, Inc. The slurry mixture was put into an autoclave having an internal volume of 2000 cm³ and heated to ensure that the autoclave had an internal temperature of 280° C. and an internal pressure of 3.7 MPa. The slurry mixture in the autoclave was agitated for 20 minutes with paddle-anchor combination type agitating blades rotating at a speed of 300 rpm and then cooled down to an ambient temperature. Thereafter, a solid residue in the treated recovery product thus obtained was vacuum-filtered and water was removed from a filtrate by ambient-pressure distillation. A low-boiling-point component containing phenol was then fractionated by vacuum distillation, finally taking out a recycled resin.

With these operations, the treatment capacity was restricted to the size of the autoclave. When the same quantity of slurry mixture as in Example 1 was treated at one time, it was observed that gelated matters are stuck to an inner wall of the autoclave due to unevenness in heat transfer and agitation.

Through the above operations, 202 g of a recycled resin, 157 g of a recovered solid residue and 503 g of a low-boiling-point component were obtained. The recycled resin had a weight-average molecular weight (Mw) of 5430 and a hydroxyl group equivalent of 236.

Comparative Example 2

-Treatment in Autoclave of Phenol Resin Molded Material-

The same slurry mixture as in Example 7 was put into the autoclave as used in Comparative Example 1 to perform a treatment thereof. However, the treatment was stopped halfway because it became unable to agitate the slurry mixture. The contents in the autoclave were fixedly attached in a mud-like state.

Example 10

-Recycling as Phenol Resin Molded Material- 100 parts by weight of the recycled resin obtained in Example 1 was blended with 15 parts by weight of hexamethylenetetramine. Gellation time of the blend was measured with a heating machine kept at 150° C. Further, 43 parts by weight of the recycled resin obtained in Example 1 was blended with 7 parts by weight of hexamethylenetetramine, 40 parts by weight of wood powder and 10 parts by weight of the solid residue obtained in Example 1. The blend was dry-mixed by a cooking mill ("Fiber Mixer" manufactured by Matsushita Electric Industrial Co., Ltd.), after which the blend was melted and kneaded by a kneader for two minutes at 110° C., thereby preparing a base material. The base material was molded into a bending test specimen under the conditions of a mold temperature of 175° C., a molding pressure of 10 MPa and a molding time of 3 minutes. A flexural strength and a flexural modulus were measured by JIS-K6911, "a general test method for thermosetting plastics". The measurement results are shown in Table 2.

Examples 11 and 12

Gellation time measurement and material evaluation were conducted through the same operations as in Example 10, except that 10 parts by weight of calcium carbonate was blended in place of the solid residue obtained in Example 1. The formulation and the measurement results are shown in Table 2.

Example 13

The same operations as in Example 10 were conducted by using the mixture of the recycled resin and the solid residue obtained in Example 3 in place of the recycled resin and the solid residue obtained in Example 1. A formulation was prepared and evaluation of the resultant material was conducted as shown in Table 2. The evaluation results are shown in Table 2. In the present example, no gellation time measurement was performed because the solid residue was contained in the recycled resin. No curability problem was posed in molding the material into a bending test specimen.

Example 14

The same operations as in Example 10 were conducted except that 43 parts by weight of a phenol novorac ("PR-51714" manufactured by Sumitomo Bakelite Company Limited) was used in place of the recycled resin obtained in Example 1 and that 10 parts by weight of the solid residue obtained in Example 2 was used in place of the solid residue obtained in Example 1. The results are shown in Table 2.

Comparative Example 3

The same operations as in Example 10 were conducted except that 43 parts by weight of a phenol novorac ("PR-51714" manufactured by Sumitomo Bakelite Company Limited) was used in place of the recycled resin obtained in Example 1 and that 10 parts by weight of calcium carbonate was used in place of the solid residue obtained in Example 1. The results are shown in Table 2.

Comparative Example 4

The same operations as in Example 10 were conducted except that 43 parts by weight of the recycled resin obtained in Comparative Example 1 was used in place of the recycled resin obtained in Example 1 and that 10 parts by weight of calcium carbonate was used in place of the solid residue obtained in Example 1. The results are shown in Table 2.

Table 2

Although Comparative Example 3 is directed to a typical phenol resin molded material with no use of the treated recovery product, comparison of the results reveals that the materials of Examples 10 to 14 exhibit the same characteristics as those of the material of Comparative Example 3.

Next, description will be made on experimental examples regarding an embodiment in which a polymerization reaction apparatus for continuously reacting a treated recovery product and an aldehyde is provided immediately next to a reactor of a decomposition reaction apparatus for continuously decomposing a plastic containing a thermosetting resin.

Example 15

-Treatment of Phenol Resin Molded Material-

A solvent consisting of 650 g of phenol and 100 g of water and a base catalyst consisting of 12.5 g of calcium hydroxide were added to 250 g of a cured product of general-purpose phenol resin molded material ("PM-8200" manufactured by Sumitomo Bakelite Company Limited) which was pulverized and sieved to have a particle size of 750 μm or less. A slurry mixture was prepared by mixing the solvent, the catalyst and the cured product for 30 minutes. The slurry mixture had a viscosity of 0.01 Pa·s which was measured at 23° C. using an E-type viscometer manufactured by Tokyo Instrument, Inc.

A system for producing a raw material for a recycled resin composition was used in which a flow type reactor for a decomposition reaction apparatus and a flow type reactor for a polymerization reaction apparatus are interconnected by a high-pressure pipeline. In this regard, the flow type reactor for a decomposition reaction apparatus is a tube-type reactor made of a Hastelloy C-276 (registered trademark) tube having an inner diameter of 6.2 mm and a total length of 13.4 m. A slurry pump with a maximum discharge quantity of 6 L/h and a maximum discharge pressure of 15 MPa is connected to this tube-type reactor. The flow type reactor for a polymerization reaction apparatus is a tube-type reactor made of a Hastelloy C-276 (registered trademark) tube having an inner diameter of 6.2 mm and a total length of 6.7 m. A plunger pump with a maximum discharge quantity of 1 L/h and a maximum discharge pressure of 15 MPa is connected to this tube-type reactor.

First, the decomposition reaction apparatus was set to achieve an in-reactor temperature of 300° C., a space time of 20 minutes and an in-reactor pressure of 10 MPa. The slurry mixture was supplied to the tube-type reactor and decomposed through a continuous operation. Subsequently, the mixture product thus obtained was introduced into the reactor of the polymerization reaction apparatus via the high-pressure pipeline. By using the plunger pump, 135 g of 37% aqueous formalin solution (containing 50 g of formaldehyde) was injected into the reactor of the polymerization reaction apparatus. The polymerization reaction apparatus was set to achieve an in-reactor temperature of 250° C., a space time of 10 minutes and an in-reactor pressure of 10 MPa. Then, polymerization reaction was performed through a continuous operation. The mixture thus obtained was separated into a filtrate and a solid residue by vacuum filtering. Water was removed from the filtrate by ambient-pressure distillation. A low-boiling-point component containing phenol was then fractionated by vacuum distillation, finally taking out a recycled resin. Analysis of the recycled resin was conducted in the same manner as in Example 1. The results are shown in Table 3.

Table 3

Examples 16 to 22

Using the same apparatus and operation as in Example 15, a cured product of a phenol resin molded material and a cured product of an epoxy resin molded material were treated according to the formulation and the conditions noted in Table 3. The results are shown in Table 3.

Example 23

-Treatment of Phenol Resin Molded Material with no Separation of Solid Residue-

Using the same apparatus and operation as in Example 15, a plastic containing a thermosetting resin was decomposed and then polymerized. Thereafter, water was removed from the resultant mixture by ambient-pressure distillation without performing any solid-liquid separating operation. A low-boiling-point component containing phenol was then fractionated by vacuum distillation, finally taking out a mixture of the recycled resin and the solid residue.

Through the above operations, 484 g of a mixture of recycled resin and solid residue and 516 g of a low-boiling-point component were obtained. A ratio of the recycled resin to the solid residue was investigated by sampling a small part of the mixture of the recycled resin and the solid residue. The investigation showed a ratio of 12 parts by weight of the solid residue to 100 parts by weight of the recycled resin. Furthermore, the recycled resin had a weight-average molecular weight of 5210 and a hydroxyl group equivalent of 125. The results are shown in Table 3.

As can be seen in Table 3, in case the polymerization reaction apparatus is provided immediately next to the reactor for the decomposition treatment, recycled resins having a weight-average molecular weight of 2400 to 8000 could be recovered in Examples 15 to 23. In case of employing no polymerization reaction apparatus, the recycled resins as recovered have a weight-average molecular weight of 880 to 4640 as is apparent from Examples 1 to 9 shown in Table 1. This means that it is possible to recover recycled resins having an increased molecular weight.

Next, description will be given to experimental examples regarding an embodiment in which a solid-liquid separating unit is provided immediately next to a reactor for continuously decomposing a plastic containing a thermosetting resin and in which a polymerization reaction apparatus for continuously reacting a treated recovery product and an aldehyde is provided immediately next to the solid-liquid separating unit.

Example 24

-Treatment of Phenol Resin Molded Material-

A solvent consisting of 650 g of phenol and 100 g of water and a base catalyst consisting of 12.5 g of calcium hydroxide were added to 250 g of a cured product of a general-purpose phenol resin molded material ("PM-8200" manufactured by Sumitomo Bakelite Company Limited) which was pulverized and sieved to have a particle size of 750 μm or less. A slurry mixture was prepared by mixing the solvent, the catalyst and the cured product for 30 minutes. The slurry mixture has a viscosity of 0.01 Pa·s which was measured at 23° C. using an E-type viscometer manufactured by Tokyo Instrument, Inc.

Use is made of a decomposition reaction apparatus to which a slurry pump with a maximum discharge quantity of 6 L/h and a maximum discharge pressure of 15 MPa is connected and which has a tube-type reactor made of a Hastelloy C-276 (registered trademark) tube having an inner diameter of 6.2 mm and a total length of 13.4 m. The decomposition reaction apparatus was set to achieve an in-reactor temperature (temperature within a decomposition reaction section) of 300° C., a space time of 20 minutes and an in-reactor pressure of 10 MPa. The slurry mixture was supplied to the tube-type reactor and decomposed through a continuous operation. Subsequently, the mixture product thus obtained was separated into a filtrate and a solid residue by vacuum filtering. Then, use is made of a tube-type reactor to which a plunger pump with a maximum discharge quantity of 1 L/h and a maximum discharge pressure of 15 MPa is connected and which is made of a Hastelloy C-276 (registered trademark) tube having an inner diameter of 6.2 mm and a total length of 6.7 m. By using the plunger pump, 135 g of 37% aqueous formalin solution (containing 50 g of formaldehyde) and the filtrate were injected into the reactor for polymerization reaction. The reactor was set to achieve an in-reactor temperature of 250° C., a space time of 10 minutes and an in-reactor pressure of 10 MPa. Then, polymerization reaction was performed through a continuous operation.

Subsequently, water was removed by ambient-pressure distillation from the mixture product which has been highly polymerized by polymerization reaction. A low-boiling-point component containing phenol was then fractionated by vacuum distillation, finally taking out a recycled resin. Analysis of the recycled resin was conducted in the same manner as in Example 1. The results are shown in Table 4.

Table 4

Examples 25 to 31

Using the same apparatus and operation as in Example 24, a cured product of phenol resin molded material and a cured product of epoxy resin molded material were treated according to the formulation and the conditions noted in Table 4. The results are shown in Table 4.

As can be seen in Table 4, recycled resins having a weight-average molecular weight of 2800 to 9000 could be recovered in Examples 24 to 31 by providing the polymerization reaction apparatus immediately next to the solid-liquid separating unit. In case of employing no polymerization reaction apparatus, the recycled resins as recovered have a weight-average molecular weight of 880 to 4640 as is apparent from Examples 1 to 9 shown in Table 1. This means that it is possible to recover recycled resins having an increased molecular weight.

Example 32

-Recycling as Phenol Resin Molded Material- 100 parts by weight of the recycled resin obtained in Example 15 was blended with 15 parts by weight of hexamethylenetetramine. Gellation time of the blend was measured with a heating machine kept at 150° C. Further, 43 parts by weight of the recycled resin obtained in Example 15 was blended with 7 parts by weight of hexamethylenetetramine, 40 parts by weight of wood powder and 10 parts by weight of the solid residue obtained in Example 15. The blend was dry-mixed by a cooking mill ("Fiber Mixer" manufactured by Matsushita Electric Industrial Co., Ltd.), after which the blend was melted and kneaded by a kneader for two minutes at 110° C., thereby preparing a base material. The base material was molded into a bending test specimen under the conditions of a mold temperature of 175° C., a molding pressure of 10 MPa and a molding time of 3 minutes. A flexural strength and a flexural modulus were measured by JIS-K6911, "a general test method for thermosetting plastics". The measurement results are shown in Table 5.

Table 5

Example 33

Gellation time measurement and material evaluation were conducted through the same operations as in Example 32, except that 10 parts by weight of calcium carbonate is blended in place of the solid residue obtained in Example 15. The formulation and the measurement results are shown in Table 5.

Example 34

Gellation time measurement and material evaluation were conducted through the same operations as in Example 32, except that 43 parts by weight of the recycled resin obtained in Example 16 was blended in place of the recycled resin obtained in Example 15 and that 10 parts by weight of calcium carbonate was blended in place of the solid residue obtained in Example 15. The formulation and the measurement results are shown in Table 5.

Example 35

Gellation time measurement and material evaluation were conducted through the same operations as in Example 32, except that 43 parts by weight of the recycled resin obtained in Example 24 was blended in place of the recycled resin obtained in Example 15 and that 10 parts by weight of calcium carbonate was blended in place of the solid residue obtained in Example 15. The formulation and the measurement results are shown in Table 5.

Example 36

The same operations as in Example 32 were conducted by using the mixture of the recycled resin and the solid residue obtained in Example 23 in place of the recycled resin and the solid residue obtained in Example 15. A formulation was prepared and evaluation of the resultant material was conducted as shown in Table 5. The evaluation results are shown in Table 5. In the present example, no gellation time measurement was performed because the solid residue is contained in the recycled resin. No curability problem was posed in molding the material into a bending test specimen.

Example 37

The same operations as in Example 32 were conducted except that 43 parts by weight of a phenol novorac ("PR-51714" manufactured by Sumitomo Bakelite Company Limited) was used in place of the recycled resin obtained in Example 15. The results are shown in Table 5.

Comparison of the results shown in Table 5 reveals that the materials of Examples 32 to 37 exhibit characteristics equal to or better than those of the material of Comparative Example 3 which is directed to a typical phenol resin molded material using no treated recovery product. This is because a recycled resin having an increased molecular weight can be recovered by providing a section in which polymerization occurs with an aldehyde.

As described hereinabove, it is possible for the present invention to provide a system for producing a raw material for a recycled resin composition that can continuously produce a raw material for a recycled resin composition using an industrial waste or a general waste containing a thermosetting resin, a method for producing a raw material for a recycled resin composition by use of the system for producing a raw material for a recycled resin, a raw material for a recycled resin composition produced by the method for producing a raw material for a recycled resin, and a formed article formed by using the recycled resin composition raw material as a resin composition.

Industrial Applicability

The decomposition reaction apparatus, the system for producing a raw material for a recycled resin composition and the method for producing a raw material for a recycled resin composition in accordance with the present invention are capable of continuously producing a raw material for a recycled resin composition using an industrial waste or a general waste containing a thermosetting resin. Furthermore, the raw material for a recycled resin composition and the formed article of the present invention was obtained by the decomposition reaction apparatus, the system for producing a raw material for a recycled resin composition and the method for producing a raw material for a recycled resin composition in accordance with the present invention. Accordingly, the decomposition reaction apparatus, the system for producing a raw material for a recycled resin composition, the method for producing a raw material for a recycled resin composition, the raw material for a recycled resin composition and the formed article in accordance with the present invention are industrially applicable.

TABLE 1

|  | Ex. 1 | Ex. 2 | Ex. 3 | Ex. 4 | Ex. 5 | Ex. 6 |
| --- | --- | --- | --- | --- | --- | --- |
| Reactor | Flow Type | Flow Type | Flow Type | Flow Type | Flow Type | Flow Type |
| Plastic containing a thermosetting resin 1) | P | P | P | P | P | P |
| Diameter of plastic containing a thermosetting resin 2) | 750 | 750 | 750 | 750 | 750 | 1000 |
| Amount of plastic containing a thermosetting resin (g) | 250 | 250 | 250 | 250 | 250 | 250 |
| Total amount of phenol compounds | 650 | 650 | 650 | 650 | 500 | 650 |
| Phenol (g) | 650 | 500 | 600 | 500 | 500 | 650 |
| Recoverd low boiling point component of Ex. 1 (g) |  | 150 |  |  |  |  |
| Phenol novorac (g) |  |  | 50 |  |  |  |
| Cresol (g) |  |  |  | 150 |  |  |
| Other solvent ($H_2O$) (g) | 100 | 100 | 100 | 100 | 0 | 100 |
| Other solvent (ethylenglycol) (g) |  |  |  | 10 |  |  |
| Catalyst | $Ca(OH)_2$ | $Ca(OH)_2$ | $Mg(OH)_2$ | $Et_3NH_2$ | $Ca(OH)_2$ | non |
| Amount of the catalyst (g) | 12.5 | 0.5 | 12.5 | 40 | 12.5 | 0 |
| Viscosity of slurry (Pa · S) | 0.01 | 0.01 | 0.01 | 0.01 | 5.2 | 0.015 |
| Temp (° C.) | 300 | 300 | 300 | 300 | 270 | 320 |
| Pressure (MPa) | 10 | 10 | 10 | 10 | 20 | 10 |
| Reaction (space) time (min) | 20 | 30 | 20 | 20 | 15 | 30 |
| Resin component yield (g) | 297 | 288 | 376 3) | 291 | 323 | 309 |
| Low boiling point component (g) | 488 | 510 | 479 | 486 | 335 | 475 |
| Recoverd residue (g) | 65 | 53 | — | 49 | 68 | 63 |
| Weight-average molecular weight of resin component | 3,010 | 2,890 | 3,130 | 2,950 | 2,990 | 3,370 |
| Hydroxyl group equivalent of resin | 126 | 131 | 135 | 126 | 122 | 147 |

|  | Ex. 7 | Ex. 8 | Ex. 9 | Com. Ex. 1 | Com. Ex. 2 |
| --- | --- | --- | --- | --- | --- |
| Reactor | Flow Type | Flow Type | Flow Type | Autoclave | Autoclave |
| Plastic containing a thermosetting resin 1) | P | P | E | P | P |

TABLE 1-continued

|  |  |  |  |  |  |
|---|---|---|---|---|---|
| Diameter of plastic containing a thermosetting resin 2) | 750 | 150 | 750 | 750 | 750 |
| Amount of plastic containing a thermosetting resin (g) | 250 | 250 | 250 | 250 | 250 |
| Total amount of phenol compounds | 25 | 650 | 380 | 650 | 25 |
| Phenol (g) | 25 | 650 | 380 | 650 | 25 |
| Recoverd low boiling point component of Ex. 1 (g) |  |  |  |  |  |
| Phenol novorac (g) |  |  |  |  |  |
| Cresol (g) |  |  |  |  |  |
| Other solvent ($H_2O$) (g) | 7 | 100 | 100 | 100 | 7 |
| Other solvent (ethylenglycol) (g) | 10 |  |  |  | 10 |
| Catalyst | $Ca(OH)_2$ |  |  | $Ca(OH)_2$ | $Ca(OH)_2$ |
| Amount of the catalyst (g) | 3 | 12.5 | 0 | 12.5 | 3 |
| Viscosity of slurry (Pa · S) | 983 | 0.01 | 0.8 | 0.01 | 983 |
| Temp (° C.) | 350 | 300 | 300 | 280 | 280 |
| Pressure (MPa) | 10 | 10 | 10 | 3.7 | — |
| Reaction (space) time (min) | 60 | 180 | 20 | 20 | — |
| Resin component yield (g) | 194 | 233 | 78 | 202 | not recover |
| Low boiling point component (g) | 11 | 549 | 268 | 503 | — |
| Recoverd residue (g) | 56 | 34 | 177 | 157 | — |
| Weight-average molecular weight of resin component | 4,640 | 1,370 | 880 | 5430 | — |
| Hydroxyl group equivalent of resin | 151 | 139 | 121 | 236 | — |

1) P PM-8200 manufactured by Sumitomo Bakelite Company Limited
2) E EME-6300H manufactured by Sumitomo Bakelite Company Limited
3) Mixture of the resin component and the residue
A ratio of the resin component to the residue was investigated by sampling a small part of the mixture.
The investigation showed a ratio of 23 parts by weight of the residue to 100 parts by weight of the resin component

TABLE 2

|  | Ex. 10 | Ex. 11 | Ex. 12 | Ex. 13 | Ex. 14 | Com. Ex. 3 | Com. Ex. 4 |
|---|---|---|---|---|---|---|---|
| Gellation time at 150° C. (sec) | 119 | 122 | 131 | — | — | 124 | 190 |
| Resin of Ex. 1 (parts by weight) | 43 |  |  |  |  |  |  |
| Resin of Ex. 2 (parts by weight) |  | 43 |  |  |  |  |  |
| Resin of Ex. 6 (parts by weight) |  |  | 43 |  |  |  |  |
| Resin of Ex. 3/Residue mixture (parts by weight) |  |  |  | 53 |  |  |  |
| Resin of Com. Ex. 1 (parts by weight) |  |  |  |  |  |  | 43 |
| Phenol novorac (parts by weight) |  |  |  |  | 43 | 43 |  |
| Hexamethylenetetramine (parts by weight) | 7 | 7 | 7 | 7 | 7 | 7 | 7 |
| Wood powder (parts by weight) | 40 | 40 | 40 | 40 | 40 | 40 | 40 |
| Recoverd residue of Ex. 1 1) (parts by weight) | 10 |  |  |  |  |  |  |
| Recoverd residue of Ex. 2 1) (parts by weight) |  |  |  |  | 10 |  |  |
| Calcium carbonate (parts by weight) |  | 10 | 10 |  |  | 10 | 10 |
| Flexural strength (MPa) | 85 | 84 | 82 | 87 | 87 | 85 | 59 |
| Flexural modulus (MPa) | 6,950 | 7,010 | 7,100 | 6,990 | 7,040 | 7,000 | 6,010 |

1) The residue was dried for 120° C., 8 hr before use and then an aggregation was crushed by a cooking mixer.

TABLE 3

|  |  | Ex. 15 | Ex. 16 | Ex. 17 | Ex. 18 | Ex. 19 | Ex. 20 |
|---|---|---|---|---|---|---|---|
| Decomposition process | Reactor | Flow Type P | Flow Type P | Flow Type P | Flow Type P | Flow Type P | Flow Type P |
|  | Plastic containing a thermosetting resin 1) |  |  |  |  |  |  |
|  | Diameter of plastic containing a thermosetting resin 2) | 750 | 750 | 750 | 750 | 750 | 750 |
|  | Amount of plastic containing a thermosetting resin (g) | 250 | 250 | 250 | 250 | 250 | 250 |
|  | Total amount of phenol compounds | 650 | 650 | 650 | 650 | 650 | 650 |
|  | Phenol (g) | 650 | 650 | 650 | 650 | 650 | 650 |
|  | Other solvent ($H_2O$) (g) | 100 | 100 | 100 | 100 | 100 | 100 |

TABLE 3-continued

|  |  |  |  |  |  |  |  |
|---|---|---|---|---|---|---|---|
|  | Catalyst | Ca(OH)$_2$ | Ca(OH)$_2$ | Ca(OH)$_2$ | Ca(OH)$_2$ | Ca(OH)$_2$ | Ca(OH)$_2$ |
|  | Amount of the catalyst (g) | 12.5 | 12.5 | 12.5 | 12.5 | 12.5 | 12.5 |
|  | Viscosity of slurry (Pa · S) | 0.01 | 0.01 | 0.01 | 0.01 | 0.01 | 0.01 |
|  | Temp (° C.) | 300 | 300 | 300 | 300 | 300 | 300 |
|  | Pressure (MPa) | 10 | 10 | 10 | 10 | 10 | 10 |
|  | Reaction (space) time (min) | 20 | 20 | 20 | 20 | 20 | 20 |
| Polymerization process | Position of polymerization reactor | after decomposition | after decomposition | after decomposition | after decomposition | after decomposition | after decomposition |
|  | Aldehyde compounds (g) | formalin | formalin | formalin | formalin | formalin | paraform |
|  | Amount of aldehyde (g) 3) | 50 | 50 | 50 | 75 | 25 | 50 |
|  | Amount of water (g) 4) | 85 | 85 | 85 | 128 | 43 | 100 |
|  | Polymerization temperature (° C.) | 250 | 200 | 300 | 250 | 250 | 250 |
|  | Polymerization pressure (MPa) | 10 | 10 | 10 | 10 | 10 | 10 |
|  | Polymerization reaction (space) time (min) | 10 | 20 | 5 | 10 | 10 | 10 |
| Product | Resin component yield (g) | 428 | 401 | 440 | 471 | 392 | 419 |
|  | Low boiling point component (g) | 516 | 544 | 504 | 469 | 555 | 528 |
|  | Recoverd residue (g) | 56 | 55 | 56 | 60 | 53 | 53 |
|  | Weight-average molecular weight of resin comoonent | 5200 | 3600 | 2400 | 8000 | 3100 | 5100 |
|  | Hydroxyl group equivalent of resin component | 125 | 121 | 122 | 122 | 123 | 121 |

|  |  |  | Ex. 21 | Ex. 22 | Ex. 23 |
|---|---|---|---|---|---|
| Decomposition process | Reactor |  | Flow Type P | Flow Type E | Flow Type P |
|  | Plastic containing a thermosetting resin 1) |  |  |  |  |
|  | Diameter of plastic containing a thermosetting resin 2) |  | 1000 | 750 | 750 |
|  | Amount of plastic containing a thermosetting resin (g) |  | 250 | 250 | 250 |
|  | Total amount of phenol compounds |  | 650 | 380 | 650 |
|  | Phenol (g) |  | 650 | 380 | 650 |
|  | Other solvent (H$_2$O) (g) |  | 100 | 100 | 100 |
|  | Catalyst |  | non | non | Ca(OH)$_2$ |
|  | Amount of the catalyst (g) |  | 0 | 0 | 12.5 |
|  | Viscosity of slurry (Pa · S) |  | 0.015 | 0.8 | 0.01 |
|  | Temp (° C.) |  | 320 | 300 | 300 |
|  | Pressure (MPa) |  | 10 | 10 | 10 |
|  | Reaction (space) time (min) |  | 20 | 20 | 20 |
| Polymerization process | Position of polymerization reactor |  | after decomposition | after decomposition | after decomposition |
|  | Aldehyde compounds (g) |  | formalin | formalin | formalin |
|  | Amount of aldehyde (g) 3) |  | 50 | 50 | 50 |
|  | Amount of water (g) 4) |  | 85 | 85 | 85 |
|  | Polymerization temperature (° C.) |  | 250 | 250 | 250 |
|  | Polymerization pressure (MPa) |  | 10 | 10 | 10 |
|  | Polymerization reaction (space) time (min) |  | 10 | 10 | 10 |
| Product | Resin component yield (g) |  | 420 | 142 | 484 5) |
|  | Low boiling point component (g) |  | 517 | 408 | 516 |
|  | Recoverd residue (g) |  | 63 | 180 | — |
|  | Weight-average molecular weight of resin comoonent |  | 5500 | 2800 | 5210 |

TABLE 3-continued

|  |  |  |  |  |
|---|---|---|---|---|
|  | Hydroxyl group equivalent of resin component | 142 | 121 | 125 |

1) P PM-8200 manufactured by Sumitomo Bakelite Company Limited
2) E EME-6300H manufactured by Sumitomo Bakelite Company Limited
3) Amout of aldehyde
In case of formalin: Amount of formaldehyde in the formalin
In case of paraform: Amount of paraform
4) Amout of water in the polymerization step
In case of formalin: Amount of water in the formalin
In case of paraform: Amount of water was added for slurrying the formalin.
5) Mixture of the resin component and the residue
A ratio of the resin component to the residue was investigated by sampling a small part of the mixture.
The investigation showed a ratio of 12 parts by weight of the residue to 100 parts by weight of the resin component

TABLE 4

| | | Ex. 24 | Ex. 25 | Ex. 26 | Ex. 27 | Ex. 28 | Ex. 29 | Ex. 30 | Ex. 31 |
|---|---|---|---|---|---|---|---|---|---|
| Decomposition process | Reactor | Flow Type P | Flow Type P | Flow Type P | Flow Type P | Flow Type P | Flow Type P | Flow Type P | Flow Type E |
| | Plastic containing a thermosetting resin 1) | P | P | P | P | P | P | P | E |
| | Diameter of plastic containing a thermosetting resin 2) | 750 | 750 | 750 | 750 | 750 | 750 | 1000 | 750 |
| | Amount of plastic containing a thermosetting resin (g) | 250 | 250 | 250 | 250 | 250 | 250 | 250 | 250 |
| | Total amount of phenol compounds | 650 | 650 | 650 | 650 | 650 | 650 | 650 | 380 |
| | Phenol (g) | 650 | 650 | 650 | 650 | 650 | 650 | 650 | 380 |
| | Other solvent ($H_2O$) (g) | 100 | 100 | 100 | 100 | 100 | 100 | 100 | 100 |
| | Catalyst | $Ca(OH)_2$ | $Ca(OH)_2$ | $Ca(OH)_2$ | $Ca(OH)_2$ | $Ca(OH)_2$ | $Ca(OH)_2$ | non | non |
| | Amount of the catalyst (g) | 12.5 | 12.5 | 12.5 | 12.5 | 12.5 | 12.5 | 0 | 0 |
| | Viscosity of slurry (Pa · S) | 0.01 | 0.01 | 0.01 | 0.01 | 0.01 | 0.01 | 0.015 | 0.8 |
| | Temp (° C.) | 300 | 300 | 300 | 300 | 300 | 300 | 320 | 300 |
| | Pressure (MPa) | 10 | 10 | 10 | 10 | 10 | 10 | 10 | 10 |
| | Reaction (space) time (min) | 20 | 20 | 20 | 20 | 20 | 20 | 20 | 20 |
| Polymerization process | Position of polymerization reactor | after solid-liquid separation | after solid-liquid separation | after solid-liquid separation | after solid-liquid separation | after solid-liquid separation | after solid-liquid separation | after solid-liquid separation | after solid-liquid separation |
| | Aldehyde compounds | formalin | formalin | formalin | formalin | formalin | paraform | formalin | formalin |
| | Amount of aldehyde (g) 3) | 50 | 50 | 50 | 75 | 25 | 50 | 50 | 50 |
| | Amount of water (g) 4) | 85 | 85 | 85 | 128 | 43 | 100 | 85 | 85 |
| | Polymerization temperature (° C.) | 250 | 200 | 300 | 250 | 250 | 250 | 250 | 250 |
| | Polymerization pressure (MPa) | 10 | 10 | 10 | 10 | 10 | 10 | 10 | 10 |
| | Polymerization reaction (space) time (min) | 10 | 20 | 5 | 10 | 10 | 10 | 10 | 10 |
| Product | Resin component yield (g) | 422 | 405 | 432 | 460 | 392 | 422 | 419 | 151 |
| | Low boiling point component (g) | 522 | 537 | 513 | 478 | 554 | 521 | 516 | 398 |
| | Recoverd residue (g) | 56 | 58 | 55 | 62 | 54 | 57 | 65 | 181 |
| | Weight-average molecular weight of resin component | 5100 | 3400 | 2800 | 9000 | 3100 | 4900 | 5600 | 2800 |
| | Hydroxyl group equivalent of resin component | 125 | 121 | 122 | 122 | 123 | 121 | 142 | 121 |

1) P PM-8200 manufactured by Sumitomo Bakelite Company Limited
2) E EME-6300H manufactured by Sumitomo Bakelite Company Limited
3) Amout of aldehyde
In case of formalin: Amount of formaldehyde in the formalin
In case of paraform: Amount of paraform
4) Amout of water in the polymerization step
In case of formalin: Amount of water in the formalin
In case of paraform: Amount of water was added for slurrying the paraform.

TABLE 5

|  | Ex. 32 | Ex. 33 | Ex. 34 | Ex. 35 | Ex. 36 | Ex. 37 |
|---|---|---|---|---|---|---|
| Gellation time at 150° C. (sec) | 101 | 99 | 126 | 97 | — | — |
| Resin of Ex. 15 (parts by weight) | 43 | 43 |  |  |  |  |
| Resin of Ex. 16 (parts by weight) |  |  | 43 |  |  |  |
| Resin of Ex. 24 (parts by weight) |  |  |  | 43 |  |  |
| Resin of Ex. 23/Residue mixture (parts by weight) |  |  |  |  | 53 |  |
| Resin of Com. Ex. 1 (parts by weight) |  |  |  |  |  |  |
| Phenol novorac (parts by weight) |  |  |  |  |  | 43 |
| Hexamethylenetetramine (parts by weight) | 7 | 7 | 7 | 7 | 7 | 7 |
| Wood powder (parts by weight) | 40 | 40 | 40 | 40 | 40 | 40 |
| Recoverd residue of Ex. 15 [1] (parts by weight) | 10 |  | 10 | 10 |  | 10 |
| Calcium carbonate (parts by weight) |  | 10 |  |  |  |  |
| Flexural strength (MPa) | 90 | 91 | 85 | 95 | 87 | 86 |
| Flexural modulus (MPa) | 7900 | 7900 | 7500 | 7800 | 7900 | 7000 |

[1] The residue was dried for 120° C., 8 hr before use and then an aggregation was crushed by a cooking mixer.

What is claimed is:

1. A system for producing a raw material for a recycled resin composition, comprising:
    a decomposition reaction apparatus comprising,
    a main reaction body, comprised of:
    an introduction section for introducing a resin composition containing a thermosetting resin and a solvent containing a monomer component of the thermosetting resin or a derivative of the monomer component;
    a decomposition reaction section for obtaining a first treated recovery product containing a recycled resin formed of the thermosetting resin with a reduced molecular weight, a solid residue and a low-boiling-point component containing the solvent, by heating and pressurizing the resin composition and the solvent and bringing the solvent into a supercritical state or a subcritical state;
    a discharge section for discharging the first treated recovery product,
    a supply unit for continuously supplying the resin composition and the solvent as a mixture to the introduction section, wherein the supply unit compromises a pressurizing device for pressurizing and supplying the resin composition and the solvent as a mixture to the introduction section;
    wherein introduction of the resin composition and the solvent into the introduction section, decomposition treatment of the thermosetting resin in the decomposition reaction section and discharge of the first treated recovery product from the discharge section are all performed continuously,
    a polymerization reaction apparatus for obtaining a second treated recovery product containing the low-boiling-point component, the solid residue and a recycled resin with an increased molecular weight obtained by introducing and polymerizing a multifunctional compound and the recycled resin with the reduced molecular weight contained in the first treated recovery product,
    a first separating unit for separating and removing the solid residue from the second treated recovery product, and
    a second separating unit for separating and extracting the recycled resin with the increased molecular weight as well as the low-boiling-point component from the second treated recovery product from which the solid residue has been removed,
    wherein the polymerization apparatus, the first separating unit and the second separating unit are connected to the discharge section of the decomposition reaction apparatus in the named sequence.

2. The system as claimed in claim 1, wherein the polymerization reaction apparatus comprises a polymerization reaction section for obtaining the second treated recovery product by polymerizing the recycled resin and the multifunctional compound and wherein introduction of the recycled resin and the multifunctional compound into the polymerization reaction section, polymerization reaction in the polymerization reaction section and discharge of the second treated recovery product from the polymerization reaction section are all performed continuously.

3. The system as claimed in claim 2, wherein the polymerization reaction section is comprised of a tube-type reactor and wherein a stationary mixer is provided within the tube-type reactor.

4. The system as claimed in claim 2, wherein a treatment temperature in the polymerization reaction section is in a range of 100 to 400° C.

5. The system as claimed in claim 2, wherein a pressure in the polymerization reaction section is equal to or smaller than 60 MPa.

6. The system as claimed in claim 2, wherein a space time in the polymerization reaction section is in a range of 1 to 60 minutes.

7. The system as claimed in claim 2, wherein the polymerization reaction section is comprised of spirally extending tube-type reactor.

8. The system as claimed in claim 1, wherein a return line for returning the low-boiling-point component extracted in the second separating unit to the introduction section of the decomposition reaction apparatus is connected to the second separating unit.

9. The system as claimed in claim 1, wherein the decomposition reaction apparatus and the first separating unit are interconnected through a cooling device for cooling the first treated recovery product discharged from the decomposition reaction apparatus.

10. A method for producing a raw material for a recycled resin composition by use of the system for producing a raw material for a recycled resin composition as claimed in claim 1, comprising:
    continuously introducing the resin composition and the solvent into the introduction section of the decomposition reaction apparatus;
    obtaining the first treated recovery product containing the recycled resin formed of the thermosetting resin with the reduced molecular weight, the solid residue and the low-boiling-point component containing the solvent, by heating and pressurizing the resin composition and the solvent in the decomposition reaction section of the decomposition reaction apparatus and bringing the solvent into the supercritical state or a subcritical state;

continuously discharging the first treated recovery product from the discharge section of the decomposition reaction apparatus, obtaining the second treated recovery product containing the low-boiling-point component, the solid residue and a recycled resin with the reduced molecular weight contained in the first treated recovery product, separating and removing the solid residue from the second treated recovery product, and separating and extracting the recycled resin with the increased molecular weight as well as the low-boiling-point component from the second treated recovery product from which the said residue has been removed, wherein the recycled resin with the increased molecular weight is used as the raw material for the recycled resin composition.

11. The system as claimed in claim 1, wherein the decomposition reaction section is comprised of a tube-type reactor and is adapted to perform the decomposition treatment with the resin composition and the solvent through the tube-type reactor.

12. The system as claimed in claim 1, wherein the supply unit comprises a mixing device for mixing the resin composition and the solvent to obtain a mixture and the pressurizing device is provided between the mixing device and the main reaction body.

13. A system for producing a raw material for a recycled resin composition, comprising:

a decomposition reaction apparatus comprising, a main reaction body, comprised of:

an introduction section for introducing a resin composition containing a thermosetting resin and a solvent containing a monomer component of the thermosetting resin or a derivative of the monomer component;

a decomposition reaction section for obtaining a first treated recovery product containing a recycled resin formed of the thermosetting resin with a reduced molecular weight, a solid residue and a low-boiling-point component containing the solvent, by heating and pressurizing the resin composition and the solvent and bringing the solvent into a supercritical state or a subcritical state;

a discharge section for discharging the first treated recovery product, supply unit for continuously supplying the resin composition and the solvent as a mixture to the introduction section, wherein the supply unit comprises a pressurizing device for pressurizing and supplying the resin composition and the solvent as a mixture to the introduction section;

wherein introduction of the resin composition and the solvent into the introduction section, decomposition treatment of the thermosetting resin in the decomposition reaction section and discharge of the first treated recovery product from the discharge section are all performed continuously, a first separating unit for separating and removing the solid residue from the first treated recovery product, a polymerization reaction apparatus for obtaining a second treated product containing the low-boiling-point component and a recycled resin with an increase molecular weight obtained by introducing and polymerizing a multifunctional compound and the recycled resin with the reduced molecular weight contained in the first treated recovery product, and a second separating unit for separating and extracting the recycled resin with the increased molecular weight as well as the low-boiling-component from the second recovery product, wherein the first separating unit, the polymerization unit and the second separating unit are connected to the discharge section of the decomposition reaction apparatus in the named sequence.

* * * * *